United States Patent [19]

Feistel

[11] 3,798,359

[45] Mar. 19, 1974

[54] BLOCK CIPHER CRYPTOGRAPHIC SYSTEM

[75] Inventor: Horst Feistel, Mount Kisco, N.Y.

[73] Assignee: International Business Machines Corporation, Armonk, N.Y.

[22] Filed: June 30, 1971

[21] Appl. No.: 158,360

[52] U.S. Cl. .................. 178/22, 340/172.5, 340/348
[51] Int. Cl. .............................................. H04l 9/00
[58] Field of Search ............ 178/22; 340/172.5, 348

[56] References Cited

UNITED STATES PATENTS

| | | | |
|---|---|---|---|
| 3,657,699 | 4/1972 | Rocher | 178/22 |
| 2,984,700 | 5/1961 | Small | 178/22 |
| 3,170,033 | 2/1965 | Vasseur | 178/22 |
| 2,995,624 | 8/1961 | Watters | 178/22 |
| 2,917,579 | 12/1959 | Hagelin | 178/22 |

*Primary Examiner*—Benjamin A. Borchelt
*Assistant Examiner*—H. A. Birmiel
*Attorney, Agent, or Firm*—Victor Siber

[57] ABSTRACT

A cryptographic system for encrypting a block of binary data under the control of a key consisting of a set of binary symbols. The cryptographic system is utilized within a data processing environment to ensure complete privacy of data and information that is stored or processed within a computing system. All authorized subscribers who are permitted access to data within the network are assigned a unique key consisting of a combination of binary symbols. The central processing unit within the computing network contains a complete listing of all distributed authorized subscriber keys. All communications transmitted from terminal input are encrypted into a block cipher by use of the cryptographic system operating under the control of the subscriber key which is inputed to the terminal device. At the receiving station or central processing unit, an identical subscriber key which is obtained from internal tables stored within the computing system is used to decipher all received ciphered communications.

The cryptographic system develops a product cipher which is a combination of linear and nonlinear transformations of the clear message, the transformation being a function of the binary values that appear in the subscriber key. In addition to the transformation, the key controls various register substitutions and modulo-2 additions of partially ciphered data within the cryptographic system.

13 Claims, 31 Drawing Figures

INVENTOR
HORST FEISTEL

BY Victor Siber
ATTORNEY

| | | | |
|---|---|---|---|
| FIG. 4A | FIG. 4B | FIG. 4C | FIG. 4D |
| FIG. 4E | FIG. 4F | FIG. 4G | FIG. 4H |
| FIG. 4I | FIG. 4J | FIG. 4K | FIG. 4L |

ENCIPHER →↓ (top row); DECIPHER →↑ (bottom row)

| | | | | | | | |
|---|---|---|---|---|---|---|---|
| 0 | 1 | 2 | 3 | 4 | 5 | 6 | 7 |
| 7 | 8 | 9 | 10 | 11 | 12 | 13 | 14 |
| 14 | 15 | 0 | 1 | 2 | 3 | 4 | 5 |
| 5 | 6 | 7 | 8 | 9 | 10 | 11 | 12 |
| 12 | 13 | 14 | 15 | 0 | 1 | 2 | 3 |
| 3 | 4 | 5 | 6 | 7 | 8 | 9 | 10 |
| 10 | 11 | 12 | 13 | 14 | 15 | 0 | 1 |
| 1 | 2 | 3 | 4 | 5 | 6 | 7 | 8 |
| 8 | 9 | 10 | 11 | 12 | 13 | 14 | 15 |
| 15 | 0 | 1 | 2 | 3 | 4 | 5 | 6 |
| 6 | 7 | 8 | 9 | 10 | 11 | 12 | 13 |
| 13 | 14 | 15 | 0 | 1 | 2 | 3 | 4 |
| 4 | 5 | 6 | 7 | 8 | 9 | 10 | 11 |
| 11 | 12 | 13 | 14 | 15 | 0 | 1 | 2 |
| 2 | 3 | 4 | 5 | 6 | 7 | 8 | 9 |
| 9 | 10 | 11 | 12 | 13 | 14 | 15 | 0 |

BLOCK CIPHER CRYPTOGRAPHIC SYSTEM

CROSS-REFERENCE TO RELATED APPLICATIONS

Reference is hereby made to application Ser. No. 158,183, of H. Feistel, filed concurrently herewith and entitled "Centralized Verification System" and to application Ser. No. 158,174, of H. Feistel, also filed concurrently herewith and entitled, "Multiple Enciphering System" for descriptions of data security systems which utilize the block ciphering cryptographic system of the present application.

BACKGROUND OF THE INVENTION

With the growing use of remote-access computer networks which provide a large number of subscribers access to "Data Banks" for receiving, storing, processing and furnishing information of a confidential nature, the question of data security has come to be of increasing concern. Generally, present day computing centers have elaborate procedures for maintaining physical security at the location where the central processor and data storage facilities are located. For example, some procedures which are used are restricting of personnel within the computing center, utilization of mechanical keys for activating computer systems and associated terminal devices, and other techniques of this type. These security procedures while providing a measure of safety in keeping out unauthorized individuals from the computing center itself, are not effective with respect to large remote access computer networks which have many terminals located at far distant sites or systems which have a capability of accepting terminal inputs via telecommunication lines.

Some digital techniques have been implemented in computing systems for the purpose of maintaining privacy of data. One such approach is the use a feature generally known as memory protection. This type of data security approach associates with various segments of the storage within the central processor a unique binary key. Then, internal to the processor, there are various protection circuits that check for a match of the binary key executable instructions and those sections of storage which are to be accessed. While this type of protection system provides a certain measure of privacy with respect to accidental destruction of stored information, it would not prove very effective in protecting information within the computing system from a sophisticated cryptanalyst who has complete knowledge of the computing system. In the field of communication, cryptography has long been recognized as a means of achieving certain aspects of security. Various systems have been developed in the prior art for encrypting messages for maintaining secrecy of communications. One well known technique for generating ciphers from clear text messages, is the use of substitution systems. Technically, in such a system, letters or symbols of the clear text are substituted by some other symbol in accordance with a predetermined "Key". The resulting substituted message, comprises a cipher which is secret and hopefully cannot be understood without knowledge of the appropriate key. A particular advantage of substitution in accordance with a prescribed key is that the deciphering operation is easily implemented by a reverse application of the key. A common implementation of substitution techniques may be found in ciphering wheel devices. For example, those disclosed in U.S. Pat. Nos. 2,964,856 and 2,984,700 filed Mar. 10, 1941 and Sept. 22, 1944, respectively.

Further teachings on the design of principles of more advanced substitution techniques may be found in "Communication Theory of Secrecy Systems" by C. E. Shannon, Bell System Technical Journal, Vol. 28, pages 656–715, October 1949. Shannon, in his paper, presents further developments in the art of cryptography by introducing the product cipher. That is, the successive application of two or more distinctly different kinds of message symbol transformations. One example of a product cipher consists of a symbol substitution (nonlinear transformation) followed by a symbol transposition (linear transformation).

Another well known technique for enciphering a clear text message communication, is the use of a ciphered stream bit sequence which is used to form a modulo sum with the symbols of the clear text. The ciphered output message stream is unintelligible without having knowledge of the stream bit generator sequence, which is sometimes referred to as a "key". Examples of such key generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example, U.S. Pat. No. 3,522,374 filed June 12, 1967 teaches the processing of a clear text message with a key material generator that controls the number of cycles for ciphering and deciphering. Related to this patent, is U.S. Pat. No. 3,506,783, filed June 12, 1967 which discloses the means for generating the key material which gives a very long pseudo random sequence.

Another approach which has been utilized in the prior art for establishing secret communications, is the coding of the electrical signals themselves which are transmitted on the channel. These types of techniques are more effective in preventing jamming or unauthorized tapping of a communications channel then in preventing a cryptanalist from understanding a cipher message. Examples of these types of systems may be found in U.S. Pat. Nos. 3,411,089, filed June 28, 1962 and 3,188,390, filed June 8, 1965.

With all of the various approaches taken in the prior art, there still remains the problem of obtaining a highly secure system applicable to a data processing environment which is not susceptible to analysis by an unauthorized individual not withstanding the fact that the unauthorized person has knowledge of the structure of the system. Furthermore, with many of the prior art devices, a cracking of the cipher may be achieved by having an opportunity to send specially designed messages through the ciphering system and observing the output; e.g., sending an all 0 pattern followed by a single bit at the various positions within the data word. None of the prior art systems have utilized the advantages of a digital processor and its inherent speed in developing a cryptographic system which produces cipher particularly useful in a computer system network, and not susceptible to "cracking" notwithstanding the possibility that the cryptanalyst has knowledge of the structure of the cryptographic device.

OBJECTS OF THE INVENTION

Therefore, it is an object of this invention to provide a cryptographic system capable of maintaining secrecy within a data processing environment.

It is another object of the present invention to provide a cryptographic system which enciphers binary data blocks into a cipher test that is not susceptible to successful cryptanalysis.

It is another object of the present invention to provide a cryptographic system that operates on block data by developing a product cipher which is dependent on a plurality of unique symbol keys, each key known only to assigned authorized users and to the system.

It is another object of the present invention to encipher a clear text message by means of a product cipher consisting of a combination of linear and nonlinear transformations that are functions of a subscriber symbol key combination.

It is another object of the present invention to provide a secrecy system to maintain privacy between a plurality of terminal users and a central processor with its associated data banks.

The foregoing and other objects, features and advantages of the invention will be apparent from the following more particular description of the preferred embodiments of the invention as illustrated in the accompanying drawings.

DETAILED DESCRIPTION OF THE INVENTION

Figure 1:
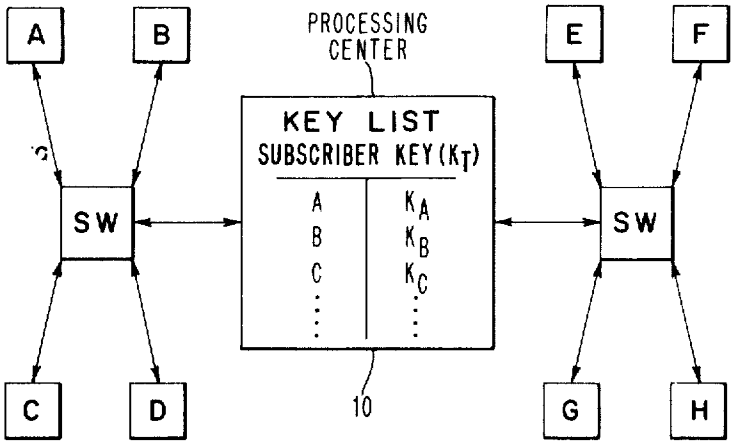
FIG. 1 is a block diagram representation of a centralized system having a plurality of subscriber terminals each with its own unique key.

Referring now to FIG. 1, there is shown a centralized subscriber network consisting of central processor unit (CPU) 10 and a plurality of terminals A, B, C, D, E, F, G and H. Each of the terminal units are connected to the central processor 10 by means of a switching device physically located at the channel connection of the CPU 10. As indicated, the CPU 10 contains a listing of system subscribers with a unique key code defined for each subscriber in the network. Note, that while the system is illustrated as having 8 terminals, in actual practice many more terminals are utilized within a data processing network. For example, CPU 10 might consist of a time sharing system such as the IBM System 360/67 being interconnected with a plurality of data storage means, input and output terminals, teleprocessing equipment, etc.

In order for a user or subscriber that is located at a particular terminal in the network to gain access to the CPU, he must identify himself to the system and be accepted as a valid subscriber before carrying out a set of communications with the CPU. A process for verification of subscribers in accordance with the users unique key code symbols is described in the Centralized Verification System of application Ser. No. 158,183. After the terminal entry has been identified by the CPU as being made by a bona fide user, data within the CPU is available to the user.

Figure 2:
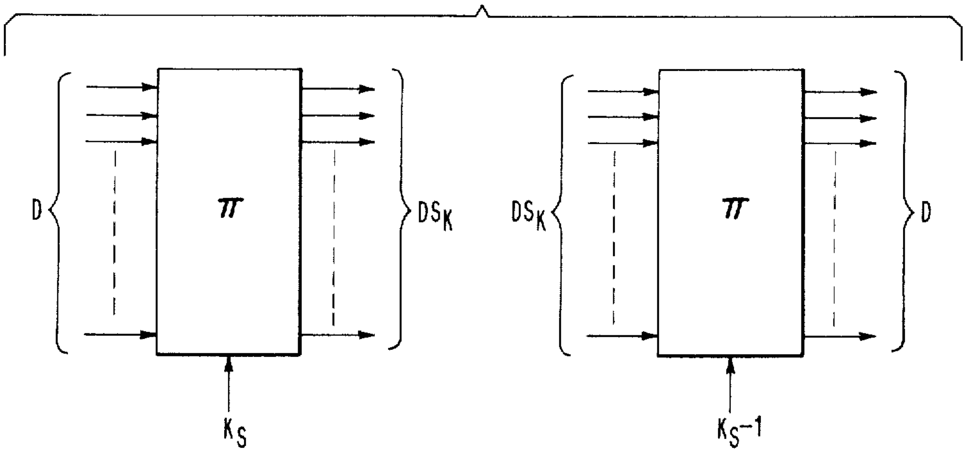
FIG. 2 is a symbolic representation of a block cipher graphic system operating on a block of data.

Referring now to FIG. 2, there is shown a symbolic representation of a block cipher cryptographic system which transforms a data block D into a cipher block $DS_k$ under the control of a specific subscriber key $K_s$. The cipher block $DS_k$ is then transmitted over some communication channel from the terminals A–H to the switching units SW which are physicall located at the extremity of the CPU. The received $DS_k$ is then processed by an inverse cryptographic block cyphering device that operates under the control of inverse key $K_s^{-1}$. The deciphering operation carried out by the cryptographic device $\pi$ re-establishes the data block D in its clear text form.

Figure 3:
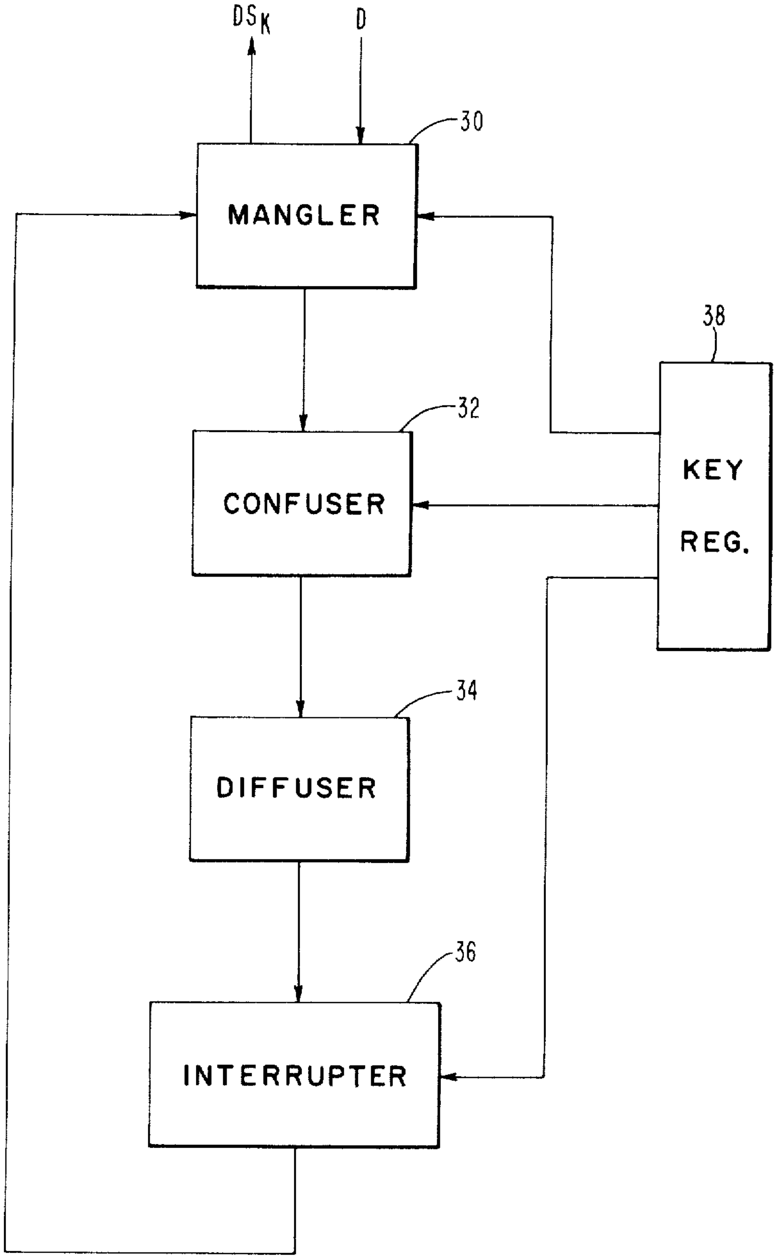
FIG. 3 is a more detailed block diagram of the block cipher cryptographic system.

Referring now to FIG. 3, there is shown a block diagram of the internal structure of the cryptographic block ciphering device which is symbolically represented by the mathematical symbol $\pi$. The $\pi$ cryptographic system is comprised of four major constituents, each making a transformation to the digital information that passes through its circuits. The constituent parts are as follows: (1) a mangler 30; (2) a confuser 32; (3) a diffuser 34; and (4) an interrupter 36. Note that various arrangements of the four constituent parts are within the scope of this invention. e.g., mangler 30 may be located at any position in the data flow. The transformations carried out by the mangler 30, confuser 32 and interrupter 36 are a function of a subscriber key $K_s$ which is stored in key register 38. A data block D which is to be enciphered by the $\pi$ cryptographic system is first introduced to the mangler 30. Note that the data block may be loaded in either serial or parallel fashion so long as the entire block D which consists of n bits is fully assembled within the internal registers of the mangler 30. The size of the data block D is a function of the specific hardware implementation of the concepts herein disclosed and the principles of the invention are not limited to any particular block size. For the purposes of this specification, a data block consisting of 48 bits in dimension is chosen.

The cryptographic system $\pi$ enciphered data block D into a $Ds_k$ by executing a plurality of transformations, substitutions, and modulo-2 additions in accordance with the condition of the binary digit appearing in the key register 28. The enciphering process is carried out by executing the cryptographic system $\pi$ several rounds, where each round represents the passing of a data block through all of the constituent stages of the cryptographic system.

During the initial round, the data block D is first loaded into the internal registers of mangler 30. At this point in time, mangler 30 does not cause any operation to be carried out on the data block. The various binary substitions of information within the internal registers of mangler 30 are carried out subsequent to the operations of interrupter 36. Note, that the operation of the mangler 30 can be instituted at any point in the flow of information through the cryptographic system, and that its placement is a matter of design choice. The data block D as it appears in the internal registers of mangler 30 is presented to the confuser 32 which provides the functional operation of a nonlinear transformation of the block output from mangler 30. This is accomplished by a substitution process which converts the n binary inputs into confuser 32 to one of the possible $2^n$ factorial combinations of the $n$ inputs. After the nonlinear transformation, the output of the confuser 32 is presented to diffuser unit 34 which provides the means for executing a transposition of the symbols appearing at the output of the confuser 32 so as to change the physical location of each of the symbols in accordance with some prewired interchange. This linear transformation of diffuser 34 which follows the nonlinear transformation of confuser 32 forms the product cipher which is further altered by the interrupter 36 which in turn executes a plurality of modulo 2 additions of the product cipher with selected signal lines from the key register 38. The output of interrupter 36, is fed back to mangler 30 which executes a further modulo 2 addition of the binary symbols appearing at the interrupter output with the binary symbols existing in the internal registers of mangler 30. Then, depending on whether symbol values of particular lines in the key register 38 are 1 or 0, shifts of data within the mangler 30 are executed or not. Note, that while in the preferred embodiments of this disclosure the interrupter 36 is located after confuser 32, it could alternatively be placed prior to the confuser 32.

In order to complete the cryptographic process and assure secrecy of the cipher text, the above process must be repeated for X rounds, where the number X is a function of the size of the key register 38. For the preferred embodiment disclosed herein it is necessary to execute 16 rounds prior to providing the cipher text output $DS_k$.

Referring now to FIGS. 4A, 4B, 4C, 4D, 4E, 4F, 4G, 4H, 4I, 4J, 4K and 4L, there is shown a more detailed schematic diagram of the $\pi$ cryptographic system. This $\pi$ cryptographic system is capable of encrypting any kind of information whatsoever, represented in terms of binary digits. It should be recognized by those skilled in the art, that while the specific implmentation of the device is shown as taking the form of a "hardware" system, the novel concepts presented herein may also be implemented by appropriately programming a general purpose computer, the choice being one of convenience and trade-off in terms of dollar cost.

For the purpose of illustration, so as to facilitate ease of understanding of the invention, the dimension of the basic message block is chosen to be 24 binary digits. It should be recognized by those skilled in the art, that this message block size is arbitrary and other message block sizes would serve the purposes of the invention as well. Generally, it is more desirable to increase the message block size in order to increase the throughput of the cryptographic system and also to generate a more complex cipher text.

As has been previously discussed above, the clear text digit block of message information D is loaded into the internal registers of the mangler unit 30. This loading of information may be accomplished by a serial insertion of binary bit data into the register, or by a parallel load of the entire word into the register. The internal input register of the mangler 30 consists of a plurality of two bit registers 41–64. Each of these two bit registers has a pair of internal connection lines 70 for shifting the bit information up or down each of the two bit registers. The 48 bit digit block D is loaded into the cryptographic system by the information in lines 80, 81, 82, 83, 84, and 85. As shown, the information in lines are grouped into quadruplets so that, for example, information in lines 80 are inputs for the two bit registers 41–44 and in a similar manner information in lines 81–85 are grouped to provide input to two bit registers 45–48, 49–52, 53–56, 57–60 and 61–64. The 48 bits of message data D are loaded 24 bits at a time, first to the upper bit storage elements of bit registers 41–64 and followed by a second 24 bits which shift the information in storage elements 41–64 into storage elements 41A–64A, thus, the second 24 information in bits of message D appear in storage elements 41–64.

After the entire block of clear text D is present in the mangler register 30, the next phase of the operation namely confusion, is begun. As indicated previously, for the first round in the cryptographic system, mangling of information by modulo 2 additions of the information in with the feedback from the interrupter does not take place. Therefore, the first round of confusion operates on the clear text binary data as it is introduced into the information in lines 81–85. Note, that as alternative design, the mangler 30 could be operated during the initial stages of the first round.

As has been previously indicated, the nonlinear transformation performed by the confuser 34 is a function of the contents of the key register 38. This key register 38 contains an authorized subscriber key $K_s$ consisting of 48 binary digits, which key is introduced into the terminal by either card, keyboard, or other convenient device indicated as a numeric key input 90 in FIG. 4. The 48 bit key is divided into a plurality of 6 eight bit shift registers 92, 93, 94, 95, 96 and 97. Each of these shift registers 92–97 contain the sequential symbols in the same order as they appear in the subscriber key $K_s$. In order to insure that each of the rounds of the $\pi$ cryptographic system is nonsystematic, thus increasing the degree of secrecy in the cipher, each of the circulating secret key shift registers 92–97 is shifted one bit for each round. The end bit of each shift register is fed back into the beginning of the shift register so that at the end of 8 shifts, the information in the shift registers 92–97 is identical to that which appeared in those registers prior to the beginning of the operation.

In order to transmit the particular control information contained in the subset key registers 92–97, a key effect router 100 is utilized. This router 100 is merely a means of transmitting the register information to a plurality of buss lines connected to the various circuits within the $\pi$ cryptographic system. Note, that while the key consists of 48 bits, the number of control buss lines emanating from the key effect router is greater than 48. This requirement may be satisfied by common usage of certain bits in the subset key registers for feeding more than one buss line, or in the alternative, a greater size key may be utilized if it is desired to do so. The key effect routers 100 is formed from a set of interconnecting electrical signal lines which are not shown in the drawing. The layout of the routing is well within the ordinary skill of the circuit design art and needs no further discussion.

The binary conditions which exist on the output lines of the key effect router 100 control the operations carried out by the confuser 32. The confuser 32 consists of a plurality of substitution devices $S_0$ and $S_1$. Associated with each quadruplet of two bit shift registers 41–44, 45–48, 49–52, 53–56, 57–60 and 61–64 are a pair of substitution devices $S_0$ and $S_1$. Each of these substitution devices performs a point permutation of the signals that are accepted through their input lines. Emanating from the mangler are a plurality of output electrical signal lines 150 – 173. Each quadruplet of these electrical signal lines provide two inputs for each single line. That is, electrical signal line 150 provides input 150*a* for substitution device $S_0$ and 150*b* for substitution device $S_1$. In a similar manner, all other electrical signal lines 151–173 are arranged to essentially duplicate the value of the electrical signal at two different inputs. Each substitution unit pair $S_0 - S_1$ carries out a nonlinear transformation of the binary signal values appearing at its inputs.

Figures 4, 4A:
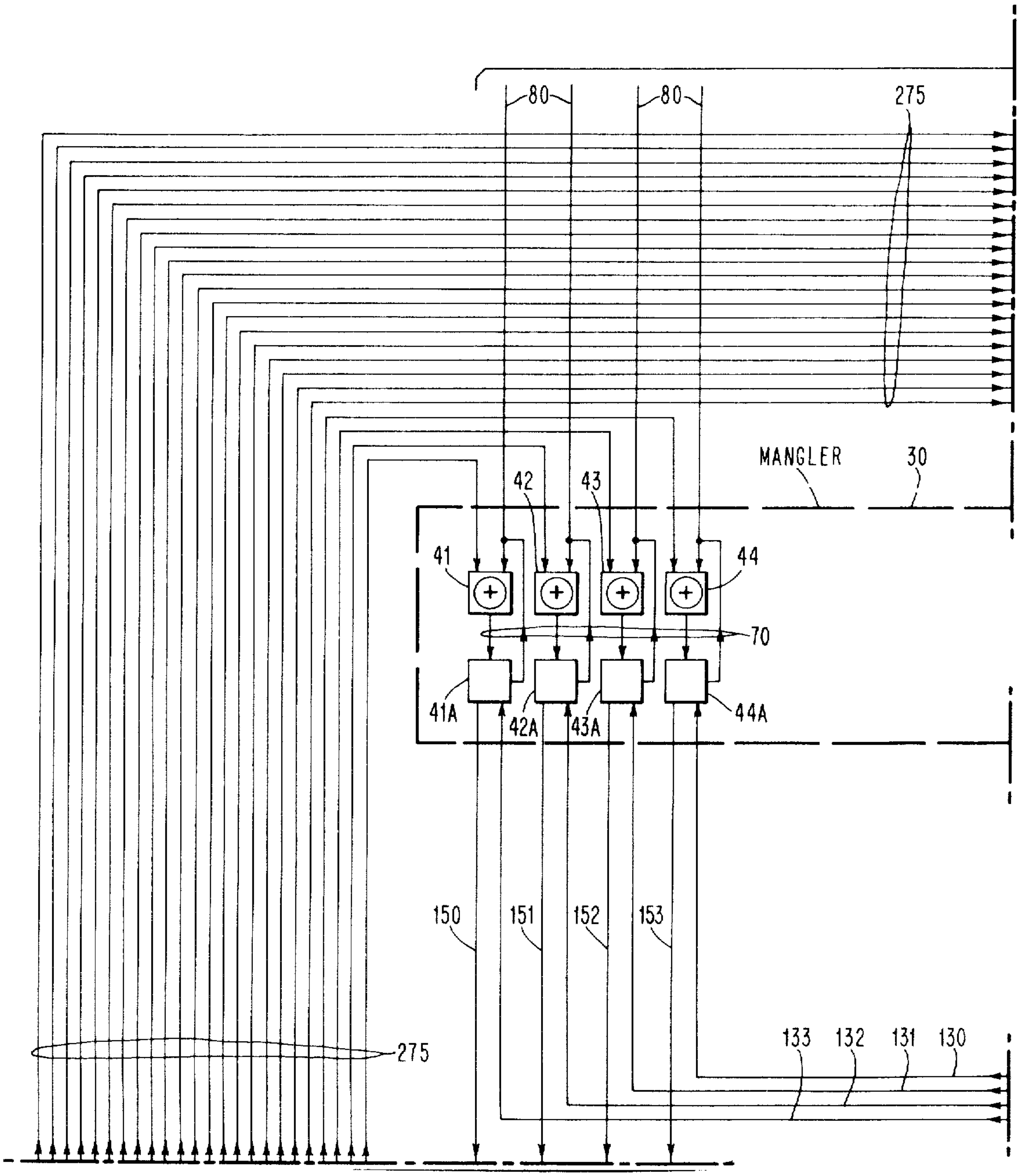
FIGS. 4A–4L are a detailed schematic diagram of the cryptographic block ciphering system shown in FIG. 3.
Figure 4B:
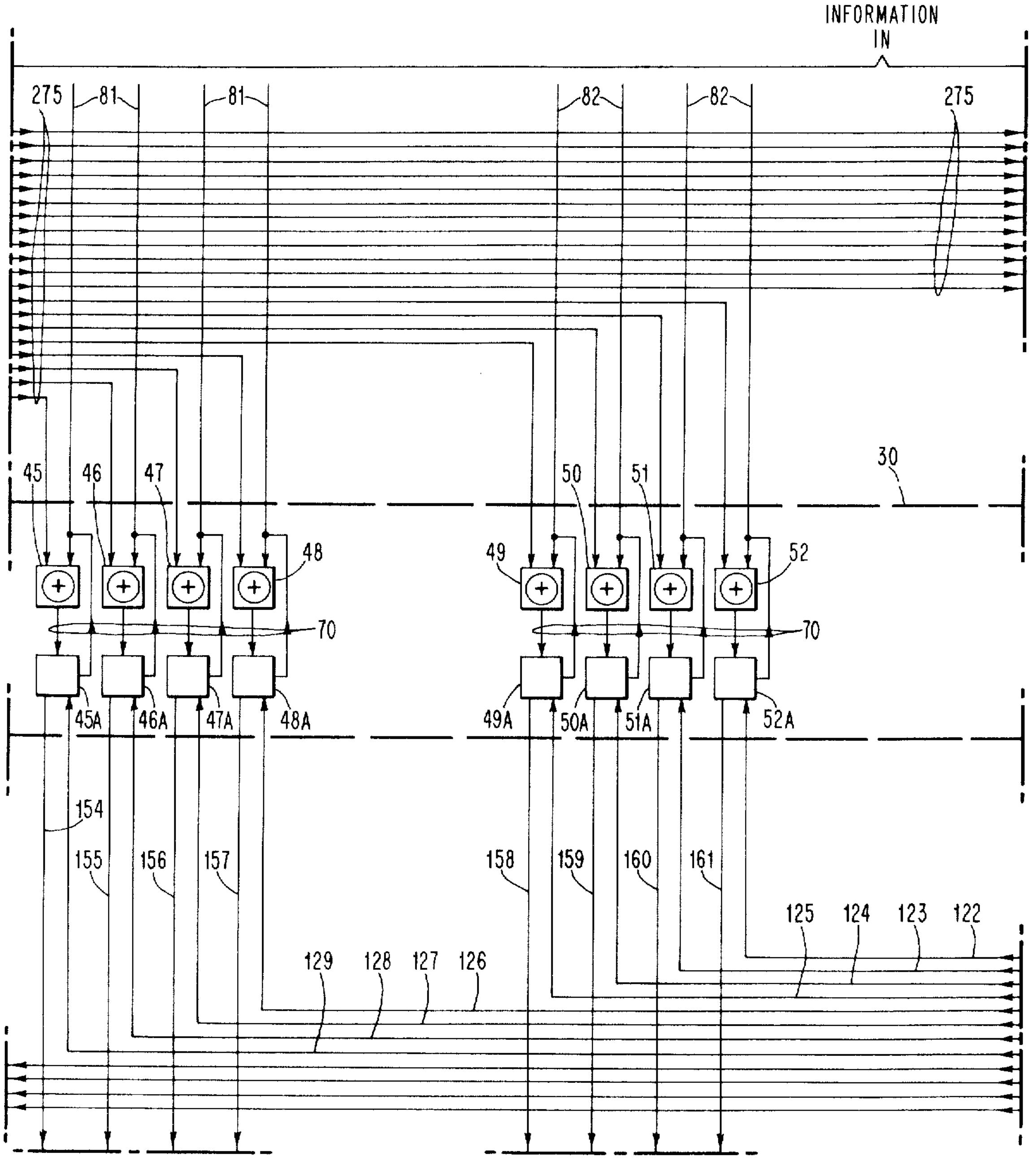
Figure 4C:
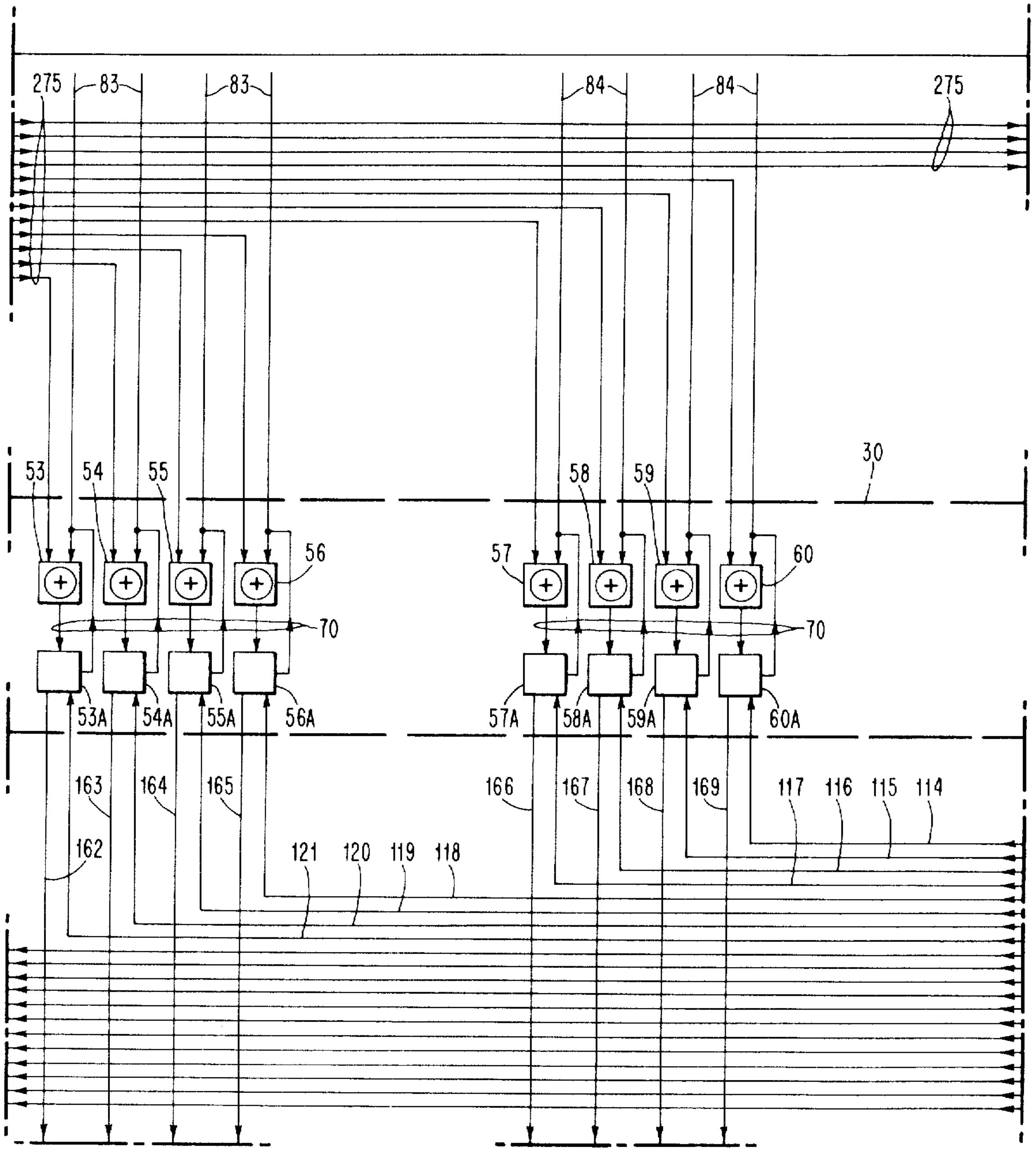
Figure 4D:
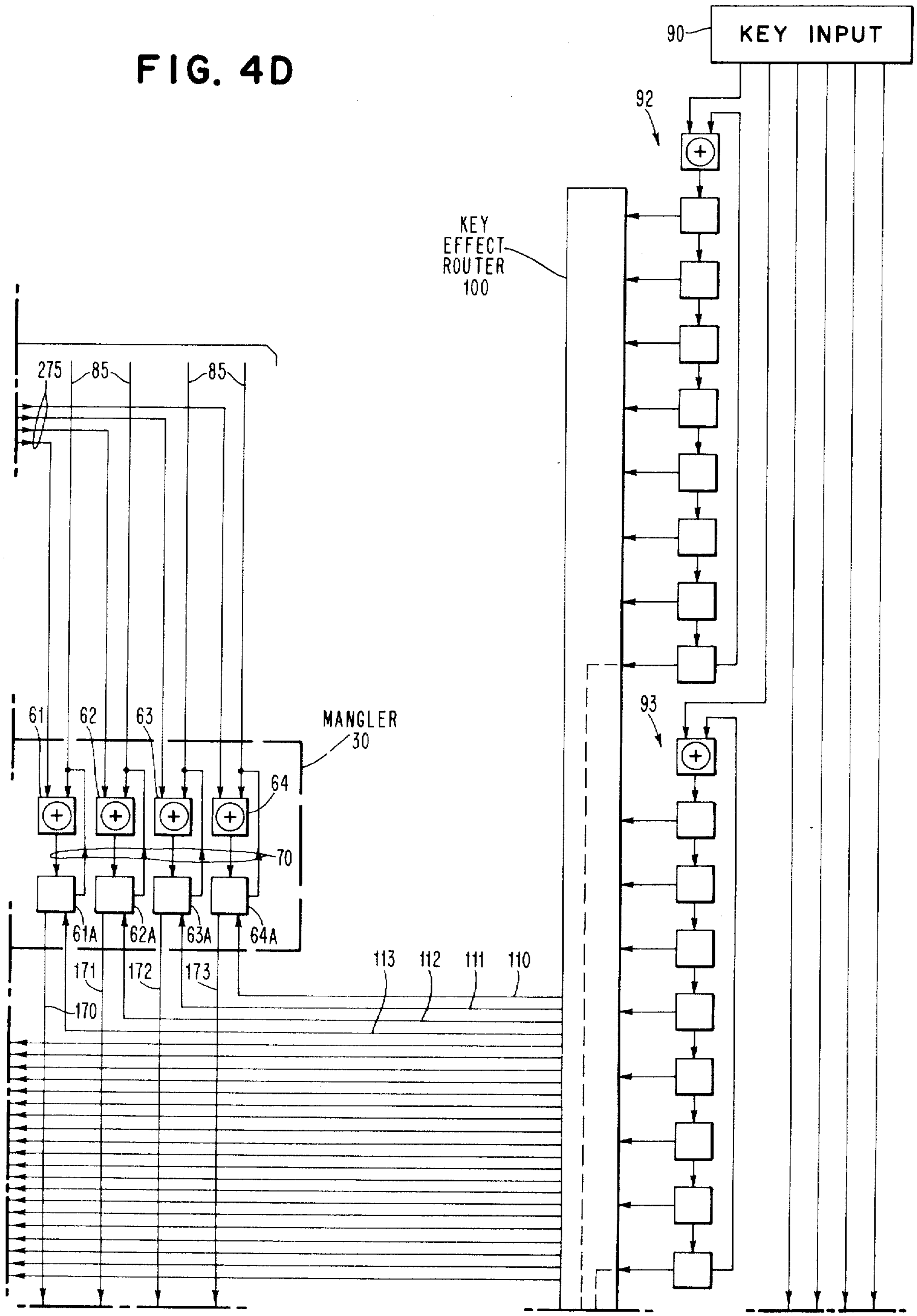
Figure 4E:
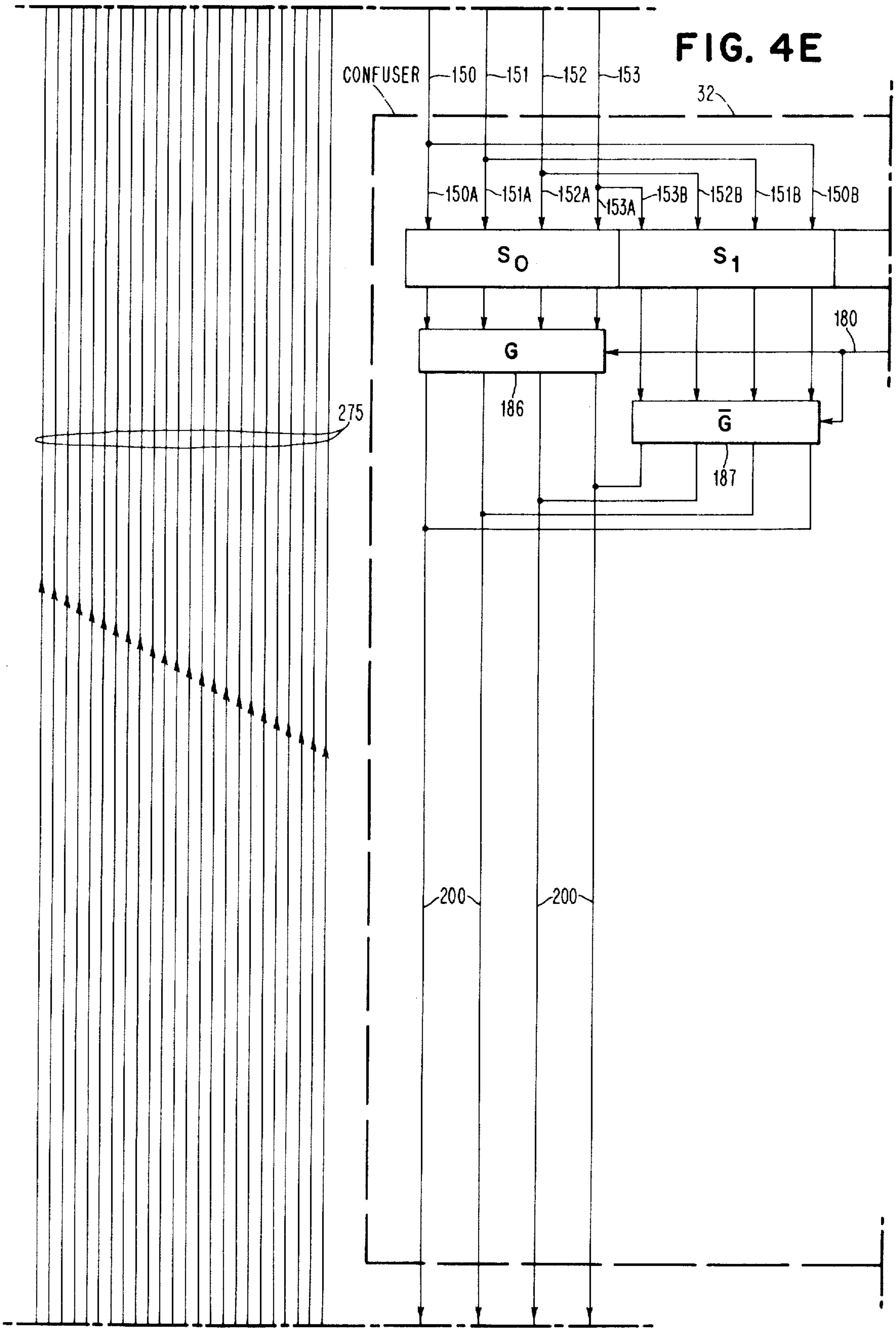
Figure 4F:
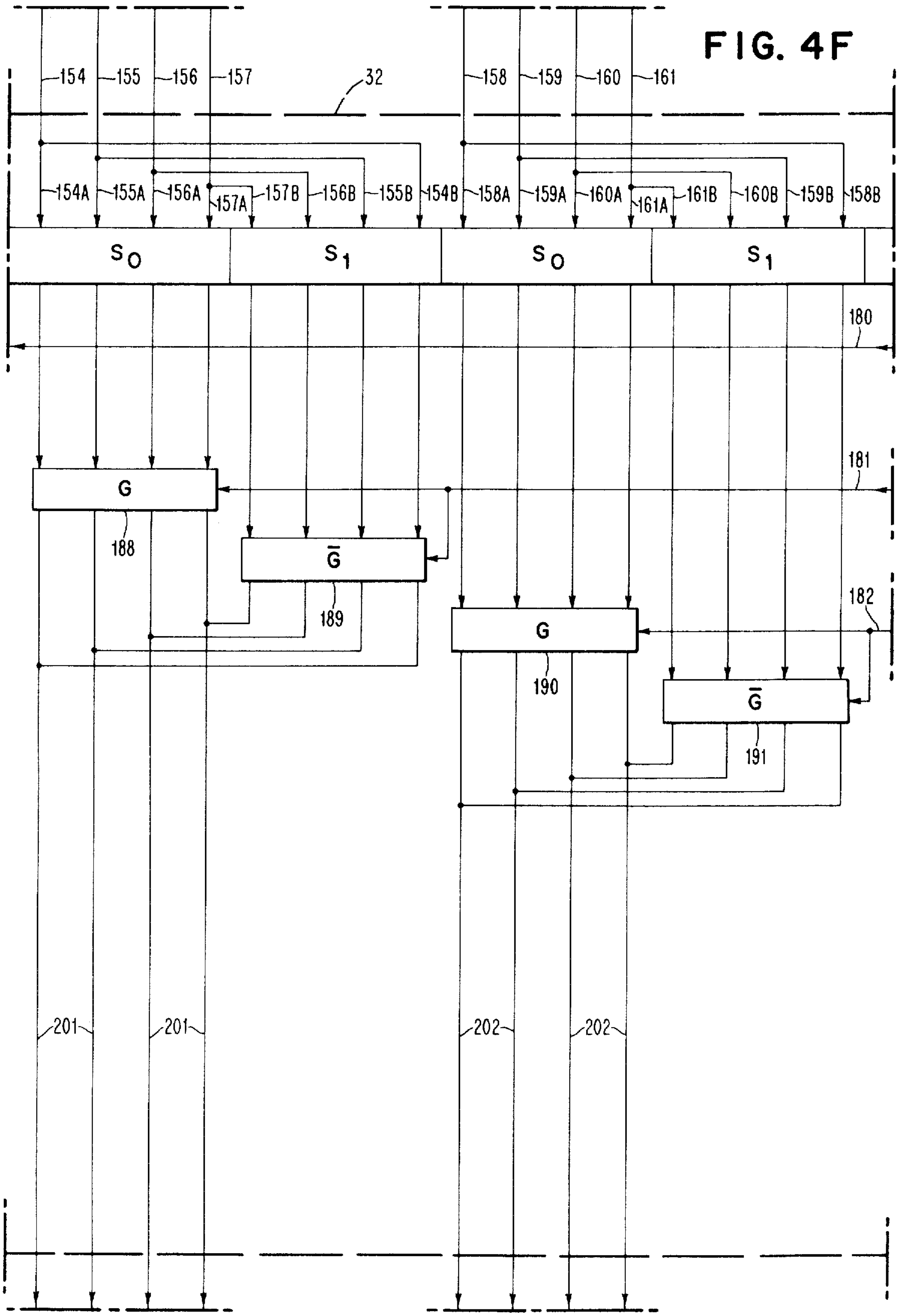
Figure 4G:
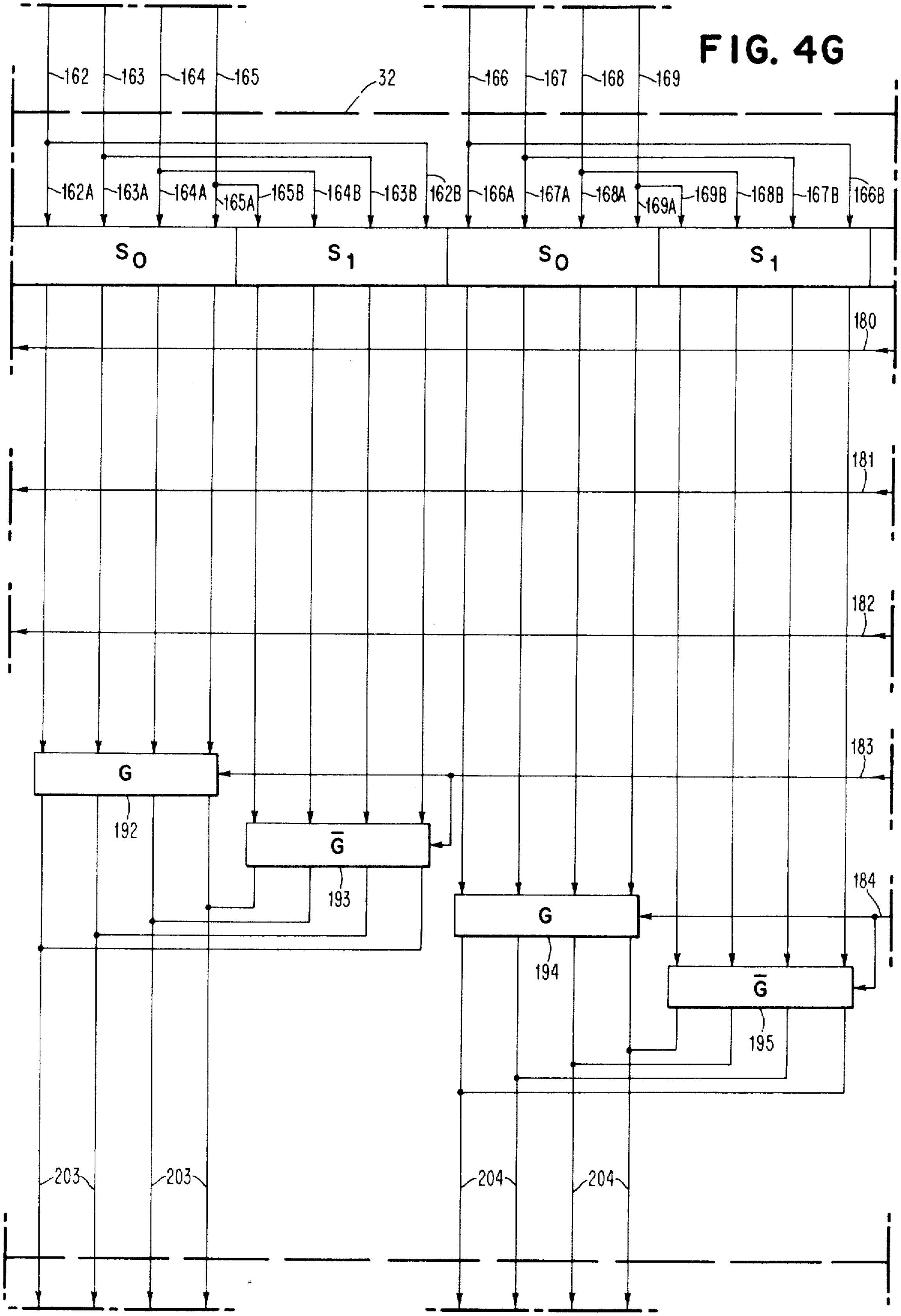
Figure 4H:
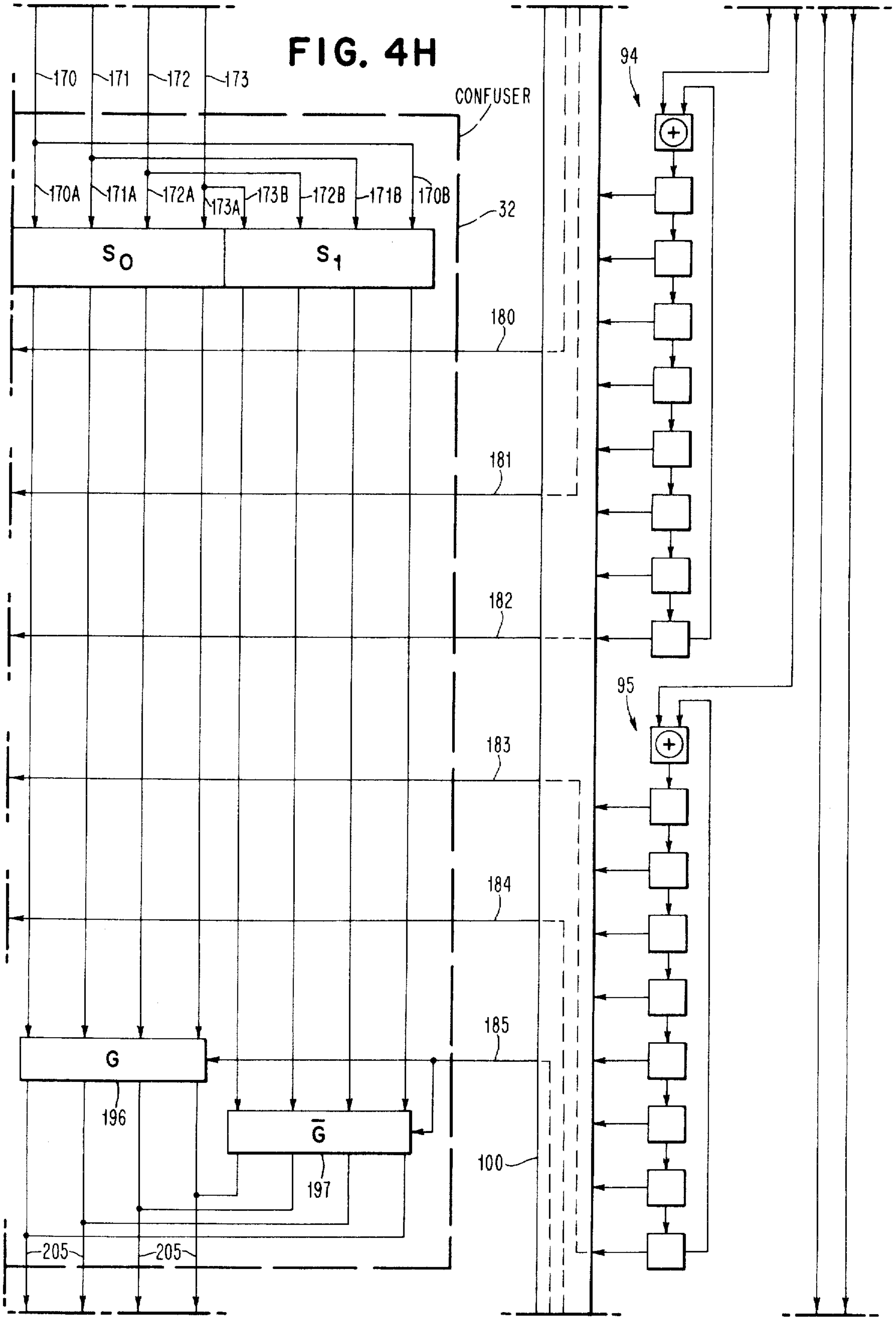
Figure 4I:
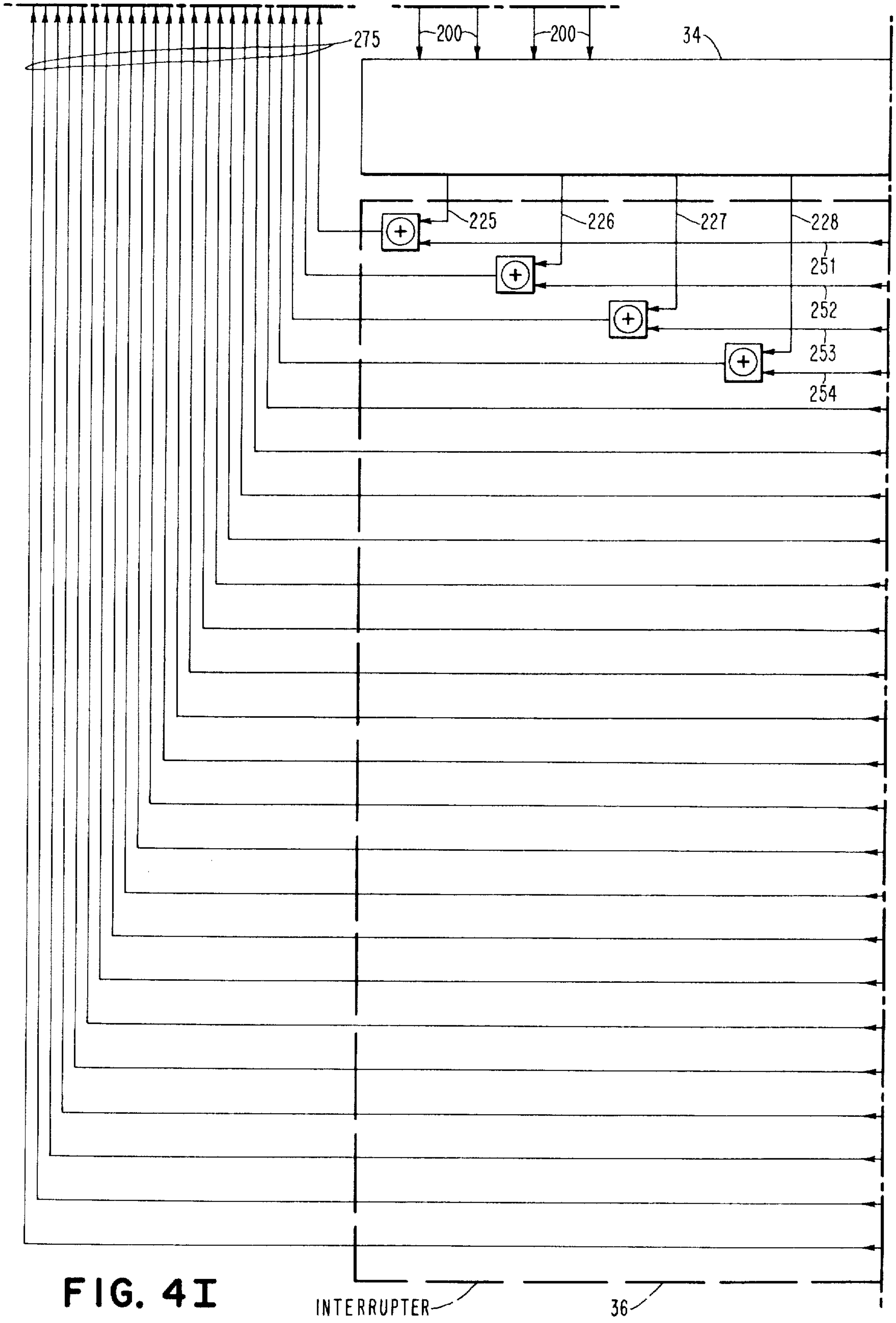
Figure 4J:
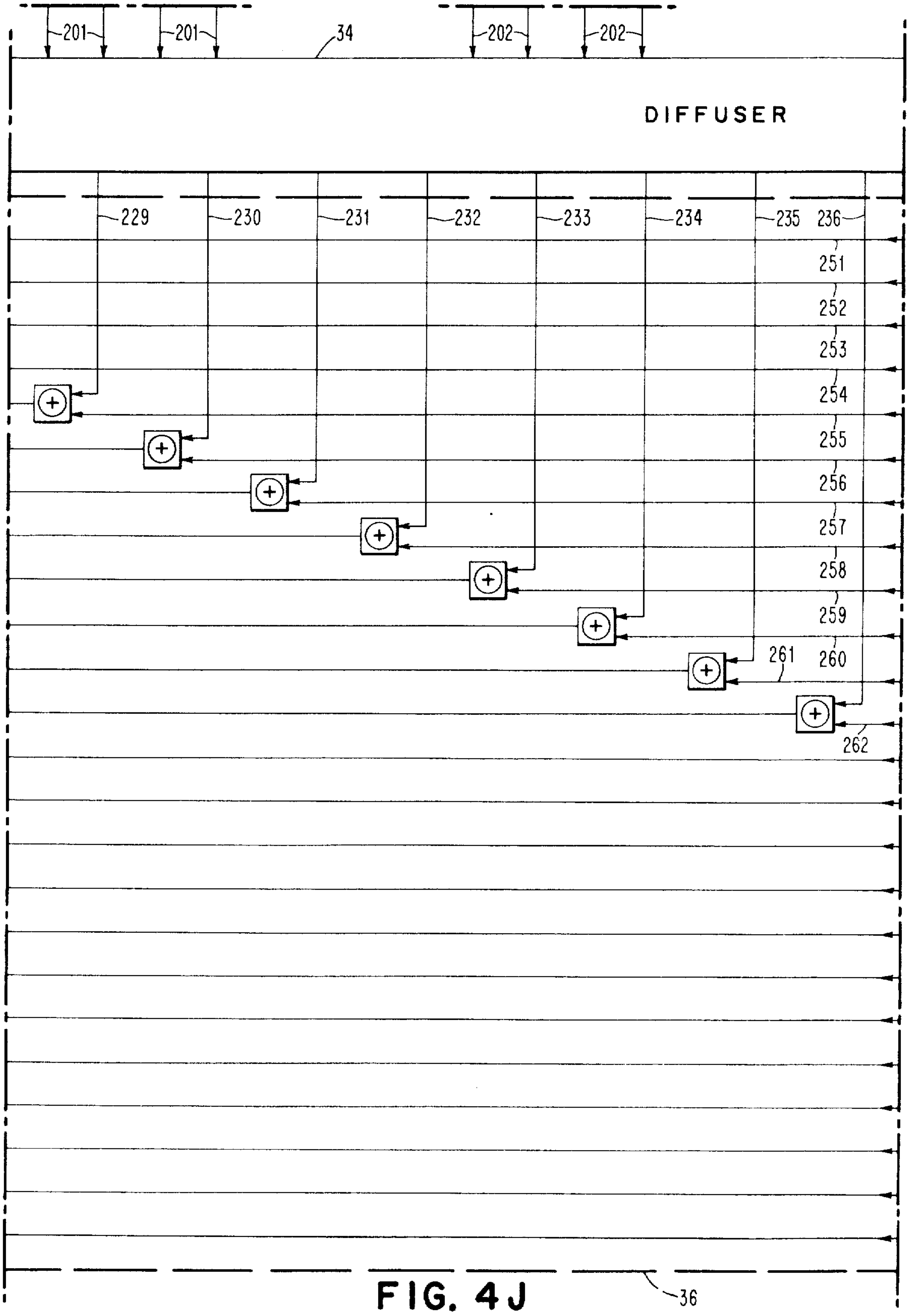
Figure 4K:
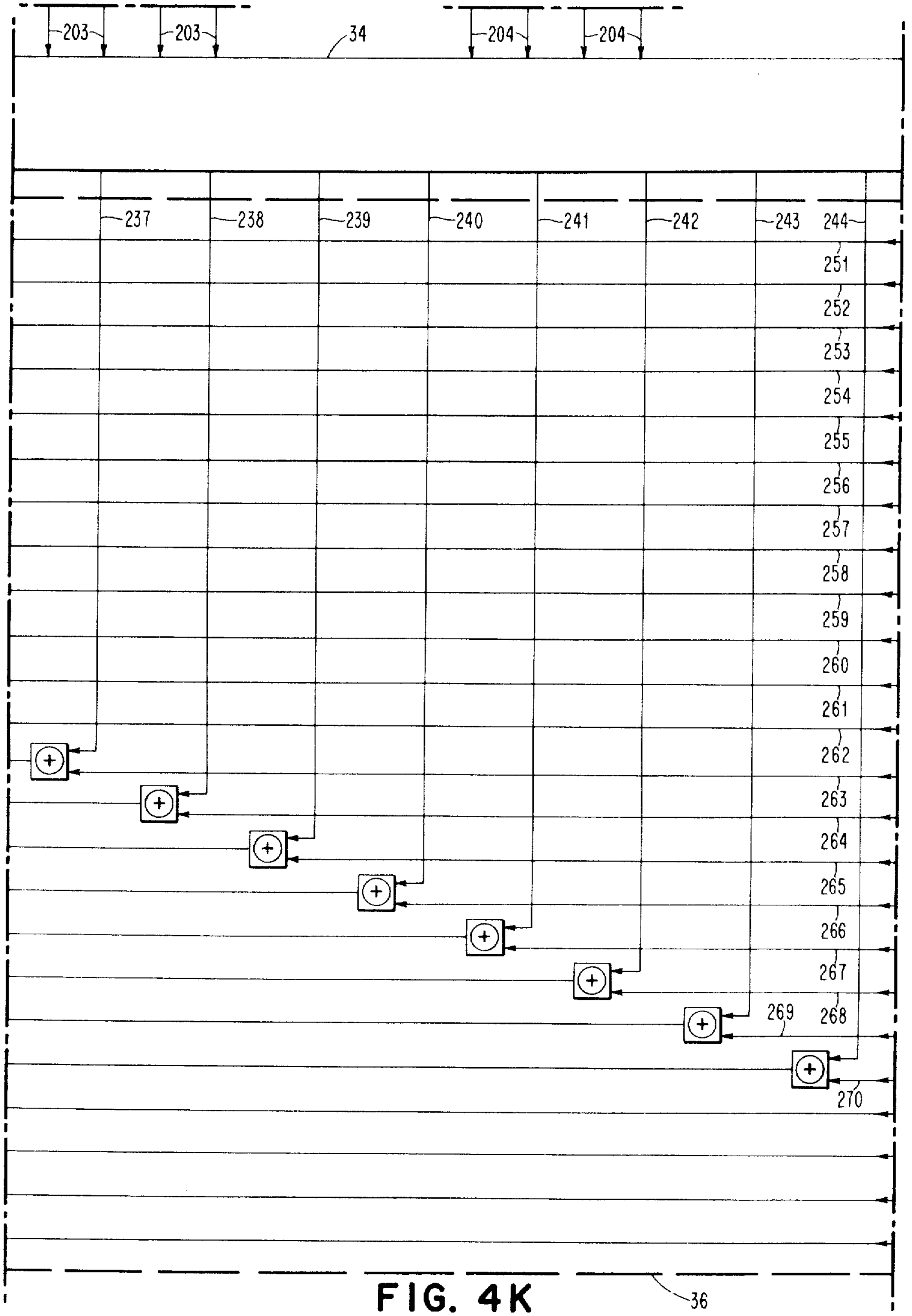
Figure 4L:
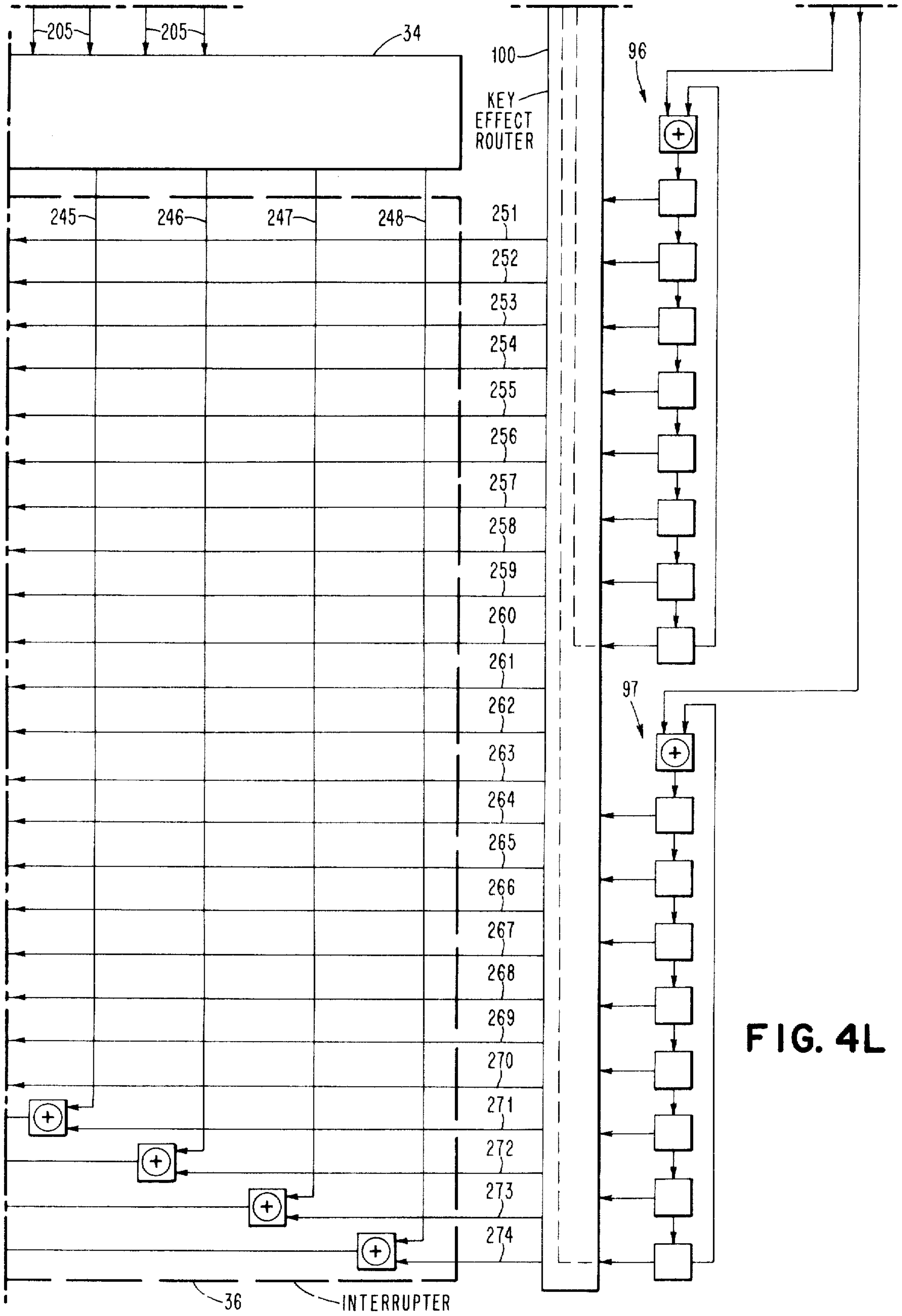
Figure 5A:
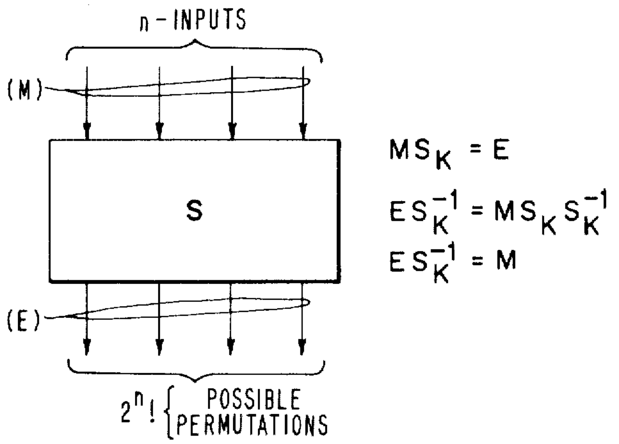
FIGS. 5A and 5B are a more detailed representation of a substitution unit within the cryptographic block ciphering system.
Figure 5B:
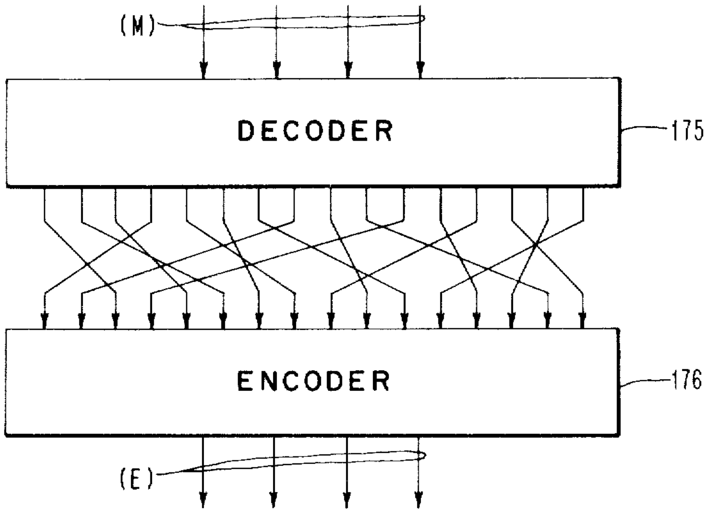

Referring to FIG. 5A and 5B, there is shown a more detailed diagram of the operation of the substitution unit. Assuming that a substitution unit S has n inputs, then a nonlinear transformation is carried out internal to the unit S so as to provide one out of $2^n!$ possible permutation. For the disclosed embodiment of FIG. 4, each substitution unit has four binary inputs. Therefore, a simple way to implement the substitution is by a decoding and encoding procedure. Specifically, the four binary inputs which can have one out of 16 possible values, is decoded so that one out of the 16 outputs of the decoder 175 will have a binary signal corresponding to the inputs on the M input lines. Decoder 175 may be thought to be nothing more than a hexadecimal to decimal decoding operation, the details of which are well known in the art. Similar to the decoder 175, the encoder 176 provides a coating of the 16 inputs into the four binary output lines E. This is effectively a decimal to hexadecimal encoding operation, also well known in the computer art. The $2^n!$ possible permutations are effected by means of the number of possibilities of interconnecting the output lines of the decoder 175 and the inputs to encoder 176. In FIG. 5B, an exemplary wiring is presented. The interconnections of the $S_0$ and $S_1$ substitution units bear no relation whatsoever. Therefore, the outputs of each of these substitution units will provide a different arrangement of binary signals for the same input signals M.

As previously discussed, the confuser 32 operates under the control of the subscriber key. This control is provided by the specific electrical binary signal values appearing on buss control lines 180, 181, 182, 183, 184, and 185. Each of these substitution control lines determines whether the $S_0$ or $S_1$ permutation is to be utilized for a particular round for a particular quadruplet. Thus, for example, if a one binary bit appeared on control line 180, bit 186 will be energized and gate 187 will be de-energized; thus, allowing the permutation generated by the $S_0$ substitution unit to be gated out to the diffuser 34. In a similar manner, the remaining control bit lines 181 – 185 gate and de-gate each of the substitution units $S_0$ and $S_1$ associated with their respective quadruplets. Note, that while the control bit lines for the disclosed embodiment are drawn from the n stage of the cyclic key subregisters 92 – 97, other arrangements are also possible. Furthermore, for the purpose of illustration of the preferred embodiment, it is assumed that all of the $S_0$ substitution units are identical and all of the $S_1$ substitution units are similarly identical, it is possible to carry out the principles of the invention by designing each substitution unit to be completely independent of all others.

The outputs of the confuser 32 appear as a plurality of quadruplet lines 200, 201, 202, 203, 204, and 205. These sets of lines are introduced into diffuser 34 which executes a linear transformation of the binary signal values appearing on lines 200 – 205. The term "linear transformation," as used herein refers to a mixing up of the 1 and 0 binary values appearing on lines 200 – 205. This diffusing is implemented by a simple interconnection of electrical lines between the input terminals and the output terminals. For example, the inputs of line 200 could be bothered so as to appear at any one of the 225 – 248 output lines. This linear transformation as carried out by diffuser 34 operates independent of the subscriber key and they function only of the pre-wiring of the diffuser 34.

The output of the diffuser 34 as appears on lines 225 – 248, is introduced into the interrupter 36 which performs a plurality of mod-2 additions in combination with a plurality of signal levels derived from the key effect router. Interrupter 36 essentially consists of 24 mod-2 adders each counting out an exclusive OR logical operation on the binary value present on one of the output lines 225–248 and the binary value present on one of the buss lines 251–274. Thus, depending on the binary signal levels derived from the subscriber key, the outputs of the diffuser 34 are or are not interrupted depending on whether a 0 or a 1 signal level appears on buss lines 251–274.

After the interrupter has completed its operation, its output is fed back by means of lines 275 to be reintroduced into the mangler 30. At this point in time, the feedback signal from the interrupter 36 acts as one input into the mod-2 adders present in each of the two bit shift registers 41–64 of mangler 30. Then, depending on the binary values present on buss control lines 110–124, the information in each of the two bit shift registers 41–64 is unaltered or shifted down to the lower storage elements 41*a*–64*a*. The mangling operation or shifting operation is conveniently implemented within the internal shift registers that accept the information into the $\pi$ cryptographic system. However, it should be recognized that the mangling function as carried out by mangler 30 could just as easily be implemented in other portions of data flow within the cryptographic system. After the mangling operation, the $\pi$ cryptographic system has completed a single round of encipherment and at this point each of the cyclic subgroup E registers are shifted one bit position prior to beginning the next round.

At the completion of eight rounds, each of the subgroup key shift registers 92–97 should be returned to their original content which existed during the first round. Furthermore, at this point the ciphering process is complete and the binary pattern which is present in mangler register 30 is a complete cipher text which is available for readout.

Note, that while the present embodiment disclosed an 8 bit cyclical shift within the subgroup shift key shift registers, it is possible to repeat the number of rounds to 16 or 32 or whatever other number is desired.

Referring now to FIGS. 6A–6F, there is shown a detailed schematic diagram of an alternative embodiment which is more economical in design, in that it reduces the number of substitution devices required by one-half. As is clearly apparent from a comparison of the second embodiment of FIG. 6 with that of FIG. 4, the entire structure is identical except for the confuser unit 32. Instead of developing 2 point permutations by the $S_0$ – $S_1$ substitution unit pairs for each quadruplet grouping of information in lines, the confuser 32 is arranged so that each $S_0 - S_1$ pair is associated with a pair of quadruplet outputs of the mangler register 30. Then, depending on the binary conditions which appear on buss lines 300, 301 and 302, each control line being connected to a plurality of gates G and $\overline{G}$ 325–372, the conditions appearing at each quadruplet will be read by either a substitution unit $S_0$ or a substitution unit device $S_1$.

A data block D which is to be enciphered by the cryptographic system is loaded into the mangler 30 by means of information lines 80, 81, 82, 83, 84, 85 and 86. Each of these information lines are arranged in quadruplets which are associated with a quadruplet set of two bit shift registers 41–64. Each shift register consisting of upper storage elements 41–64 and lower storage elements **41*a*–64*a*. The binary data which is stored in each of the upper and lower elements of the shift register sub-sections, which form the message D, may be shifted up or down in each of the two bit shift register sections dependent on the binary values that appear on the mangler control lines emanating from the key effect router 100 to the mangler 30, similar to the buss control lines 110–124 shown in FIG. 4**.

During the first round of the cryptographic system, the mangler 30 performs no initial operation on the message data D. The lower 24 bits within the storage elements **41*a*–64*a* are loaded into a plurality of gates G and $\overline{G}$, each pair of gates receiving one output from the mangler 30. For example, gates 325 and 326 receive the output line from lower storage element 41*a***. The quadruplet of shift registers which receive the quadruplet of information *n* lines have associated therewith a set of four pairs of gates G and $\overline{G}$, each gate being activated by one of the control lines 300, 301 and 302. Depending on the binary signal values on the control lines 300, 301 and 302 either the gate G or $\overline{G}$ will be activated for controlling the passage of information to a particular substitution unit $S_0$ or $S_1$. Each substitution unit consists of a decoder and encoder section with a random interconnection of wires between the output of the decoder and the input of the encoder, as shown in FIGS. 5A and 5B. By this simple device, it is possible to develop one out of $2^{n}!$ possible permutations for *n* input lines. The substitution as carried out by the $S_0$ and $S_1$ units effects a nonlinear transformation of the output of mangler 30.

Following the substitution, the outputs of the $S_0$ and $S_1$ units which are arranged in quadruplets 200, 201, 202, 203, 204, 205 and 206 are fed into diffuser 34 which carries out a linear transformation of the binary signal levels at the input and re-arranges the pattern of 1's and 0's depending on the interconnection of wires between the input and output of the diffuser 34. The outputs of diffuser 34 which appear on output lines 225–248 are fed into a plurality of mod-2 adders which carry out an exclusive OR between the output lines of diffuser 34 and the binary values derived from the key effect router 100 and appearing on lines 251–274. Each mod-2 output, is then fed back along lines 275 to be re-introduced into the mod-2 adders in the upper storage elements 41–64 of mangler 30. At this point in time, mangler 30 effects a plurality of shifts within each of the two bit shift register sections depending on the binary signal values routed from the effect router 100 by means of the mangler control lines.

Following the mangling operation by mangler 30 the $\pi$ cryptographic system is said to have completed a first round of encrypt. For subsequent rounds, each of the cyclic key subgroup registers 350, 351 and 352 is shifted one bit position. Thus, at the end of eight rounds of encryption, the data in each of the subgroup key registers 350, 351 and 352 is identical to that which appeared in the registers at the beginning of the encipherment process. While this embodiment has been described with reference to a cryptographic system that executes eight rounds, it should be recognized by those skilled in the art, that it is possible to operate the cryptographic device for more or less rounds and thereby achieve various complexities of re-arrangement of information thus controlling the probability of cracking the cipher.

In a similar manner as discussed with respect to the first embodiment, the substitutions which are executed during the confusion state are different for each round due to the fact that the conditions in the control buss lines 301–302 change in accordance with shifts which occur in the key subgroup shift registers.

Figure 6:
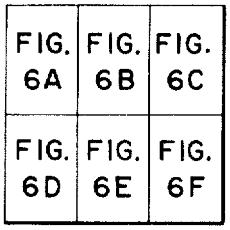
FIGS 6A through 6F show a detailed diagram of a more economical embodiment of the cryptographic block ciphering system.
Figure 6A:
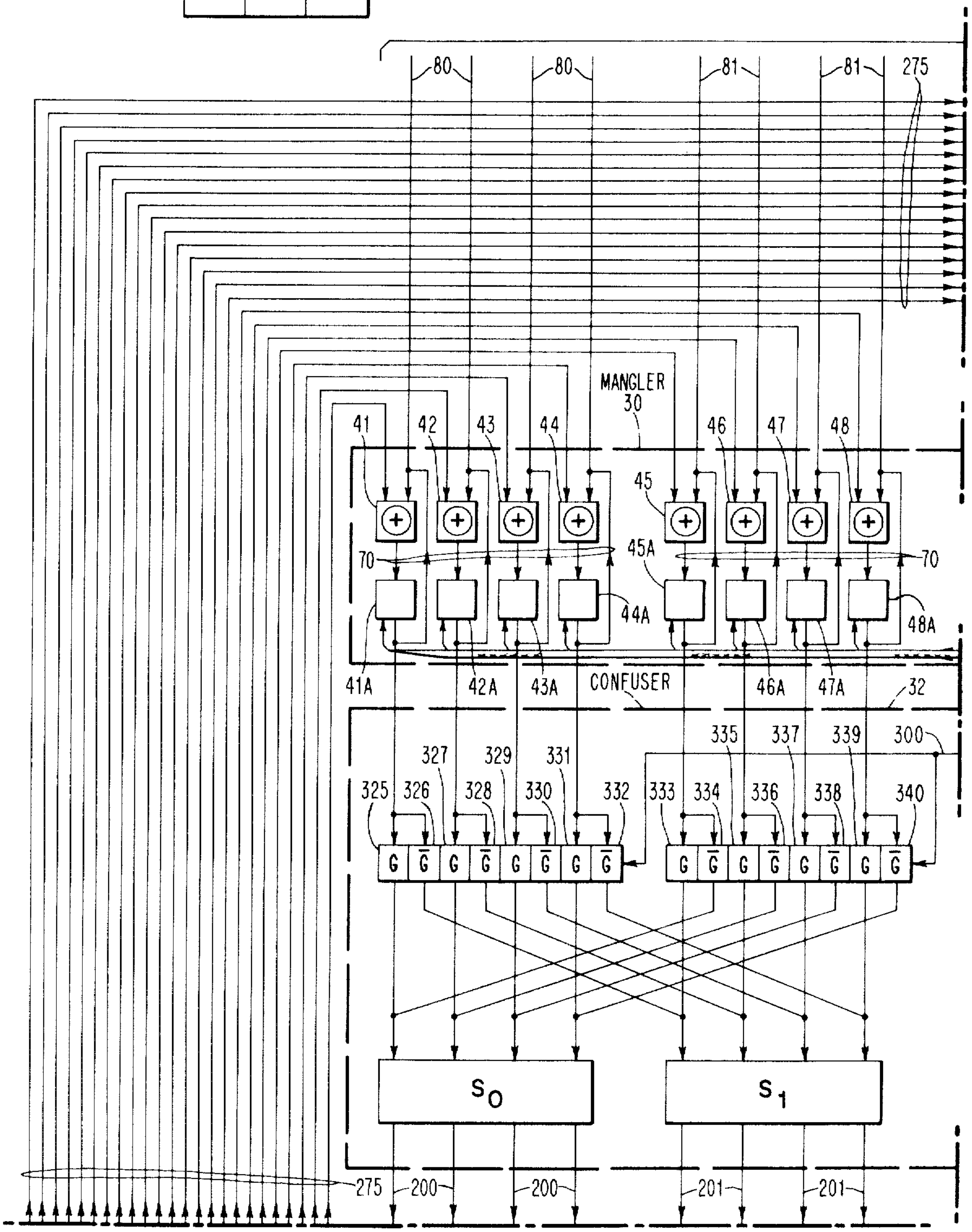
Figure 6B:
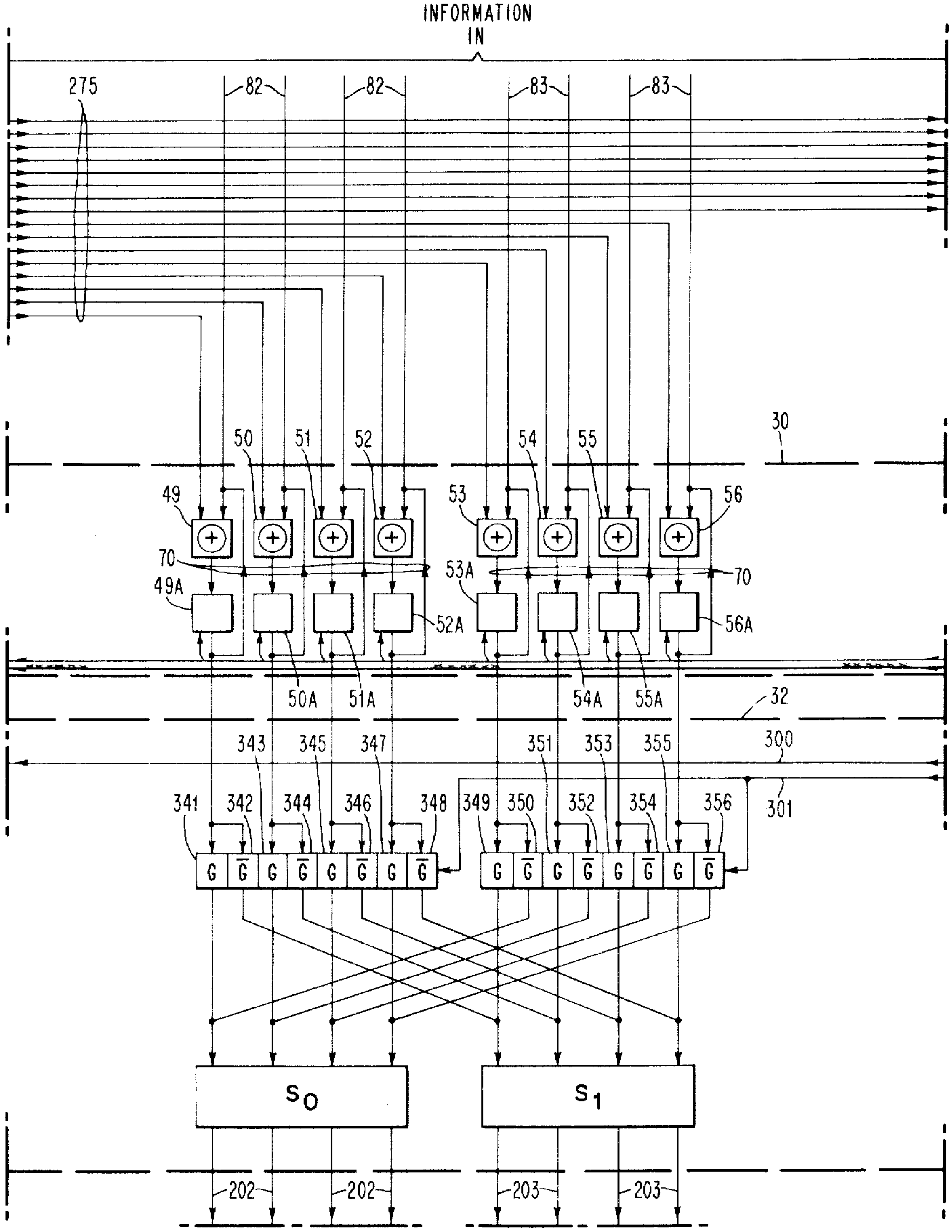
Figure 6C:
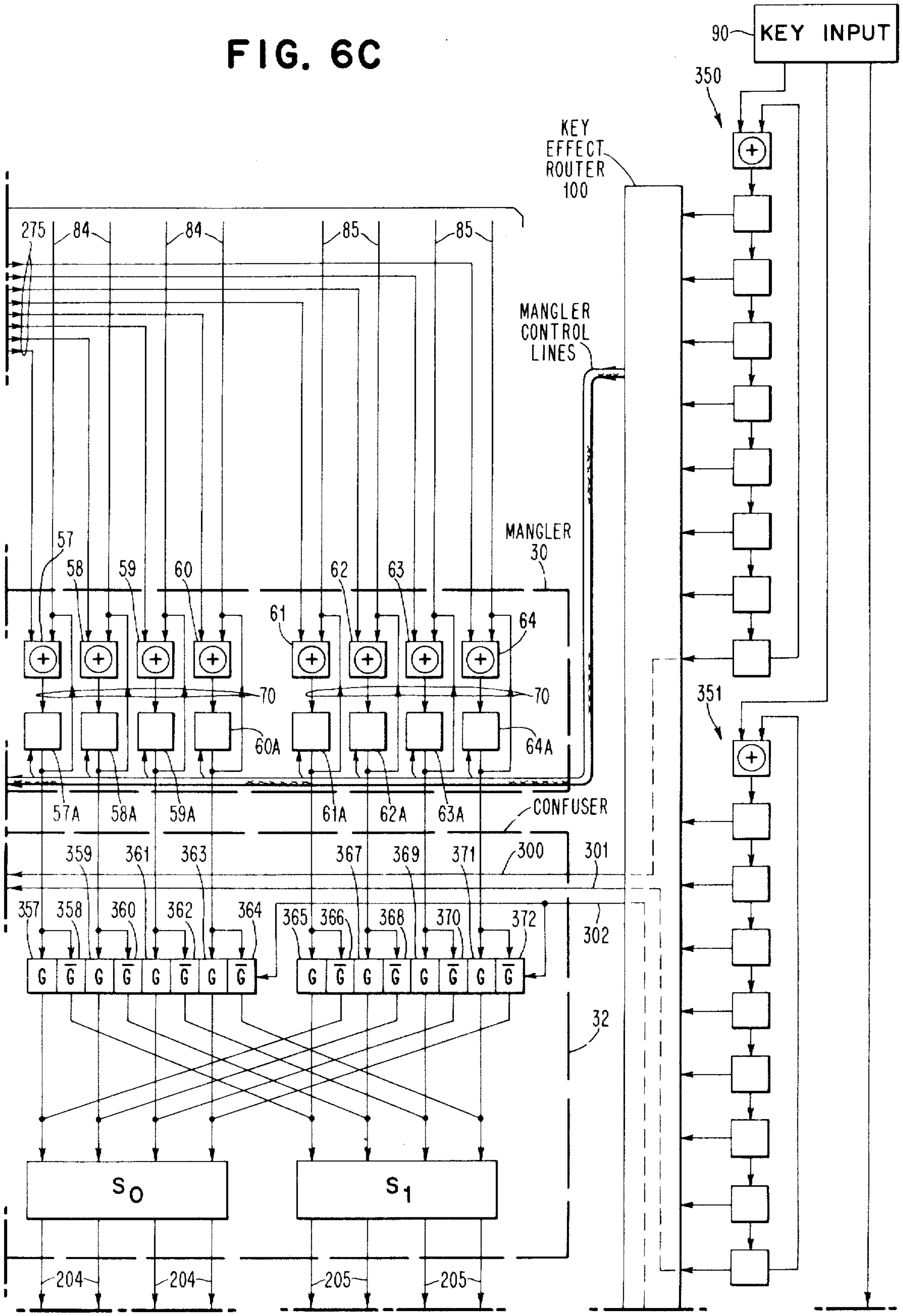
Figure 6D:
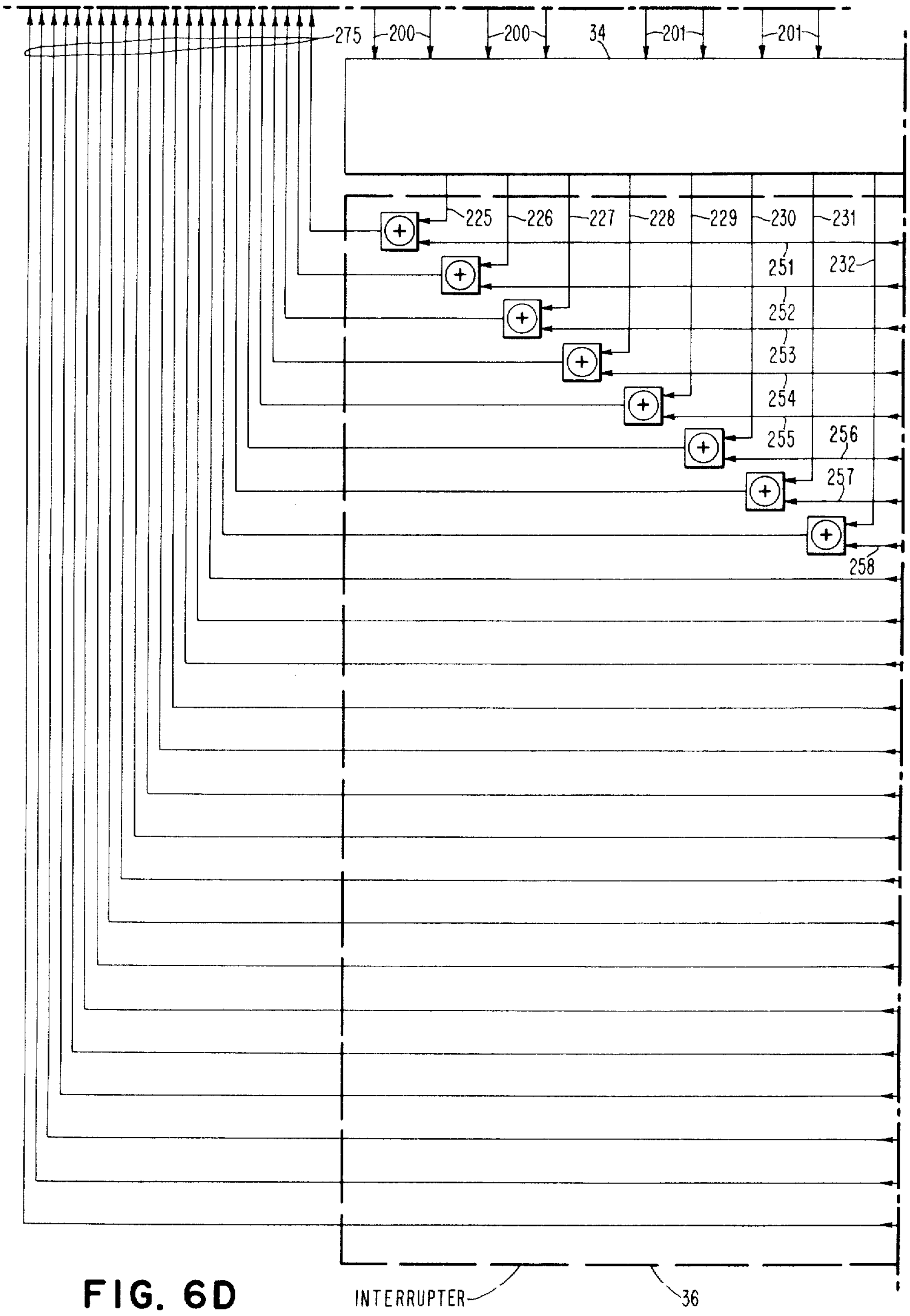
Figure 6E:
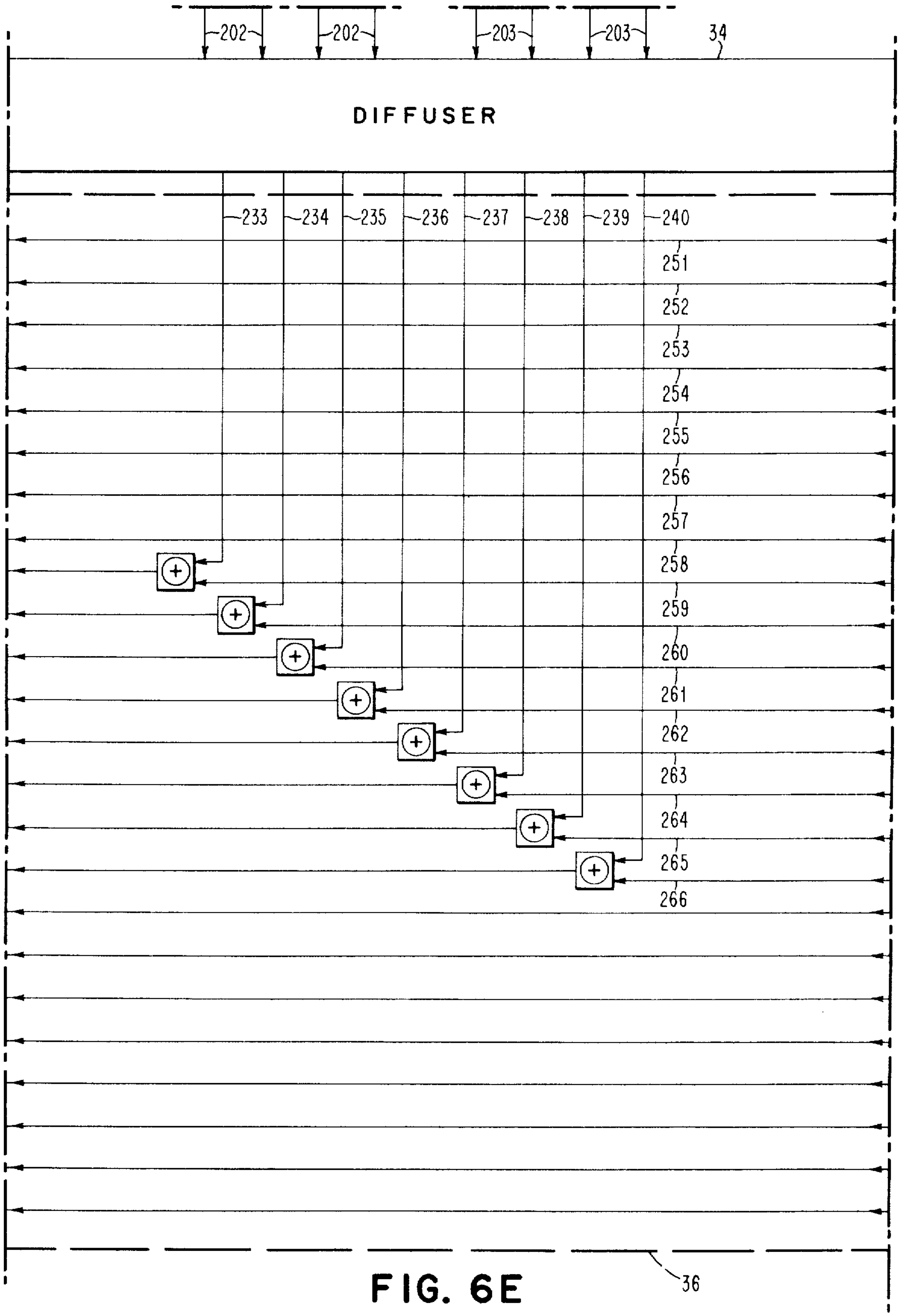
Figure 6F:
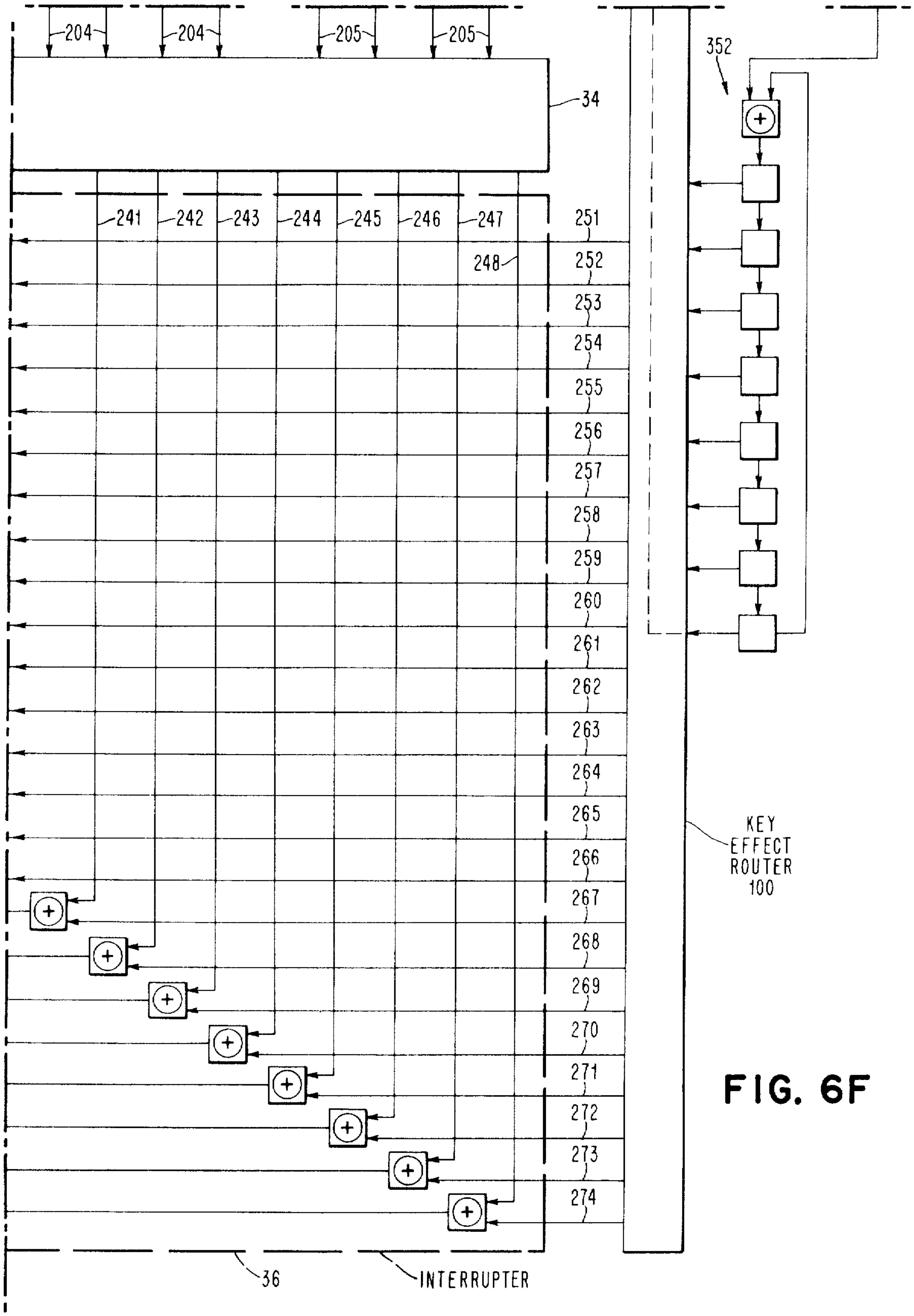

The embodiment shown in FIG. 6 provides a measure of economy in reducing the number of substitution devices necessary to handle a particular block size. Furthermore, only half as many buss control lines that operate the confuser 34 are required in comparison to the number needed in the embodiment shown in FIG. 4.

It is apparent, that the saving in the number of substitution devices has its cost in terms of reducing the number of rounds to return the key to its original state. This may be compensated by either doubling the number of rounds, or increasing the message block dimension by powers of two.

Serial Implementation of the Cryptographic System

As indicated above, the principles of the invention may be implemented in a cryptographic system which operates on message block sizes of various lengths. Furthermore, it should be recognized that it is not necessary to process the entire block width in a parallel operation if one is willing to sacrifice the additional time required to complete the ciphering process. An example of a serial system which operates on 128 bit blocks of data and creates a block cipher of the same size, operating serially on 16 bytes, each 8 bits wide, and operating parallel on a bit basis within the byte, is shown in FIGS. 7 and 8.

Figure 7:
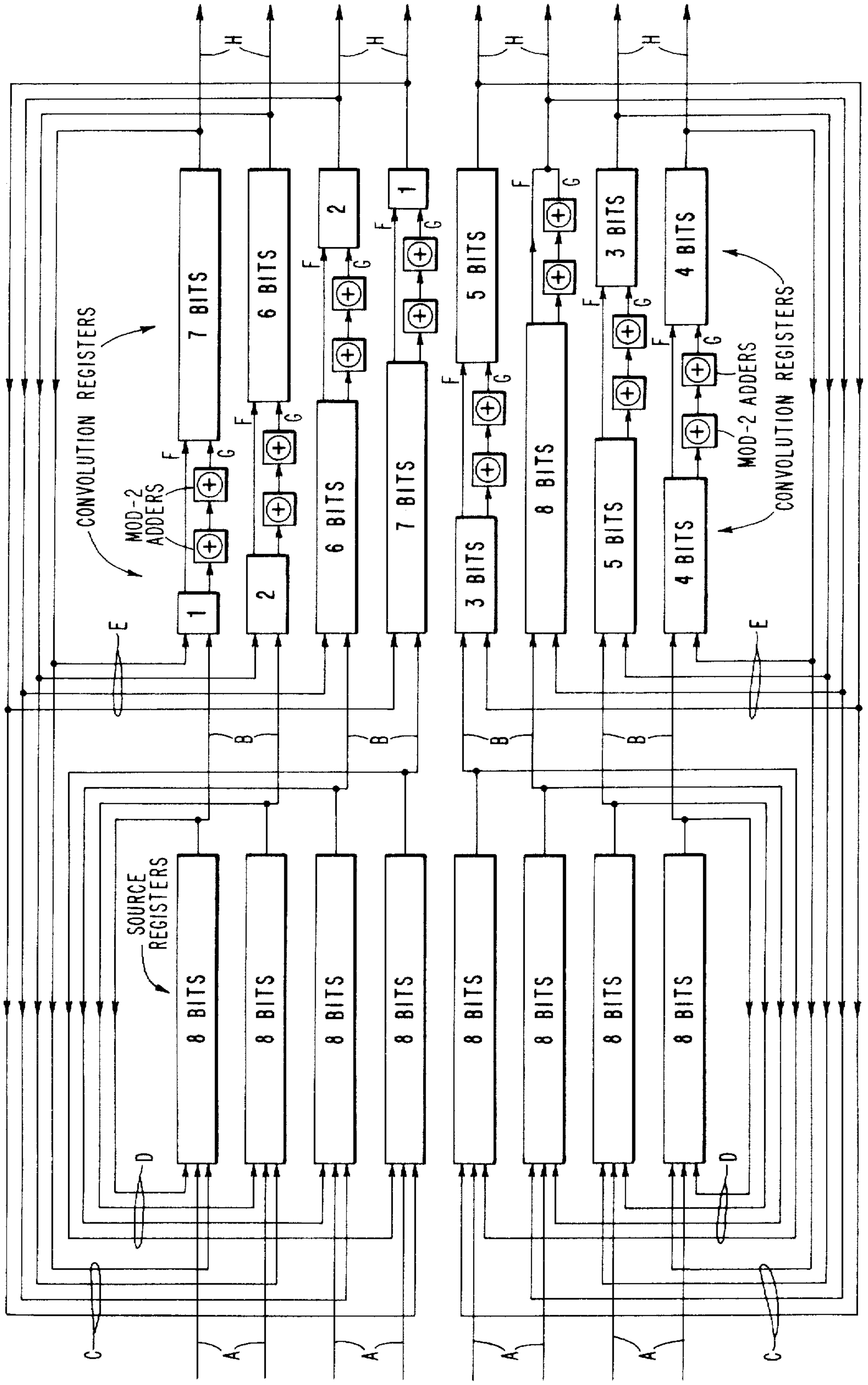
FIG. 7 shows a block diagram of a serial embodiment of the cryptographic block ciphering system.

Referring to FIG. 7, there is shown a structural representation of the data flow paths that a clear message which appears on lines A takes to be transmitted as a ciphered message which is outputed on lines H. For each block cipher process, at various times, lines A–H are either enabled or disabled depending on what part of the process is being carried out. For the ease of understanding, gating connections for engagement and disengagement of the lines are not shown.

Figure 8:
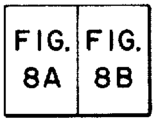
FIGS. 8A and 8B show a schematic diagram of the serial cryptographic system of FIG. 7.
Figure 8A:
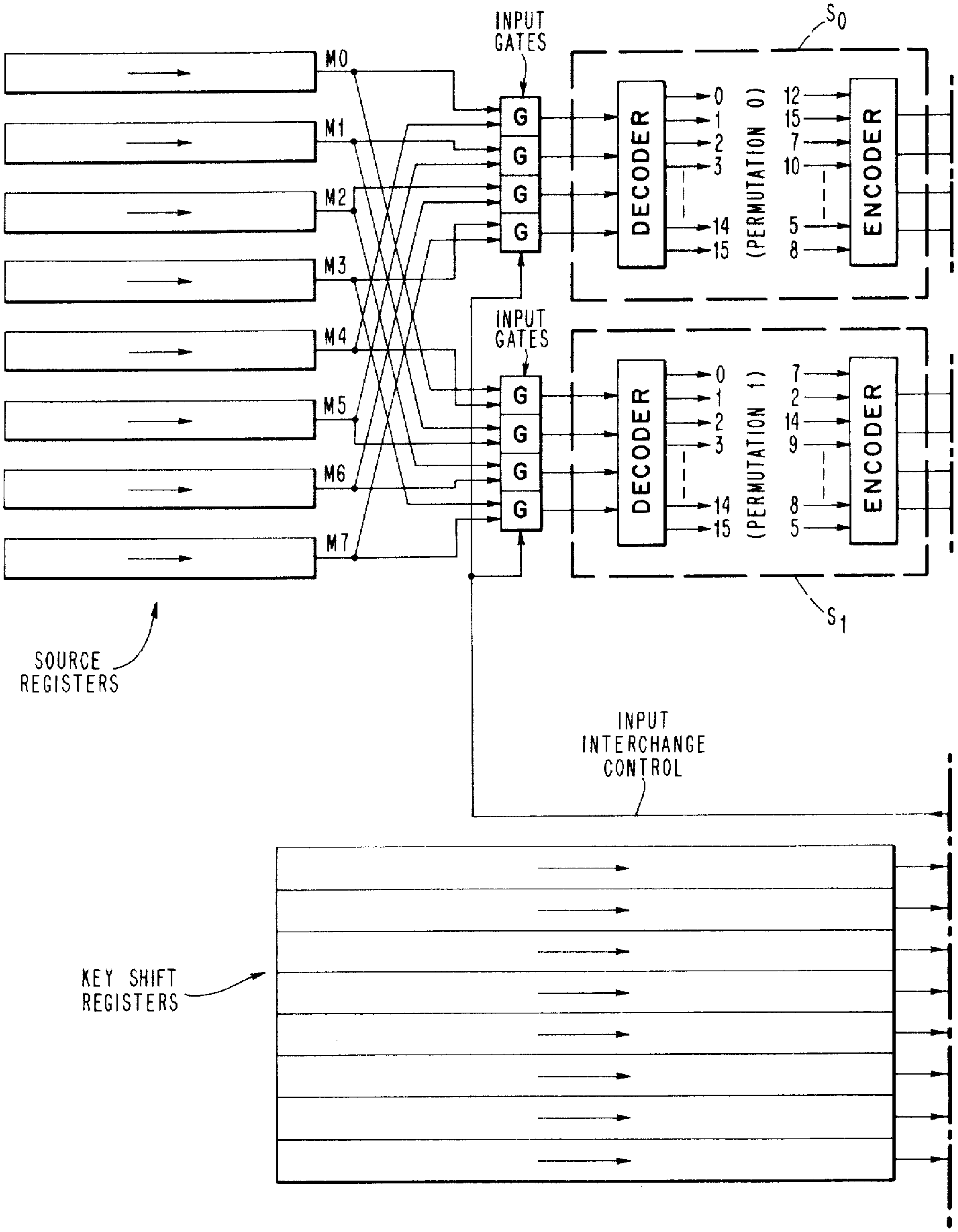
Figure 8B:
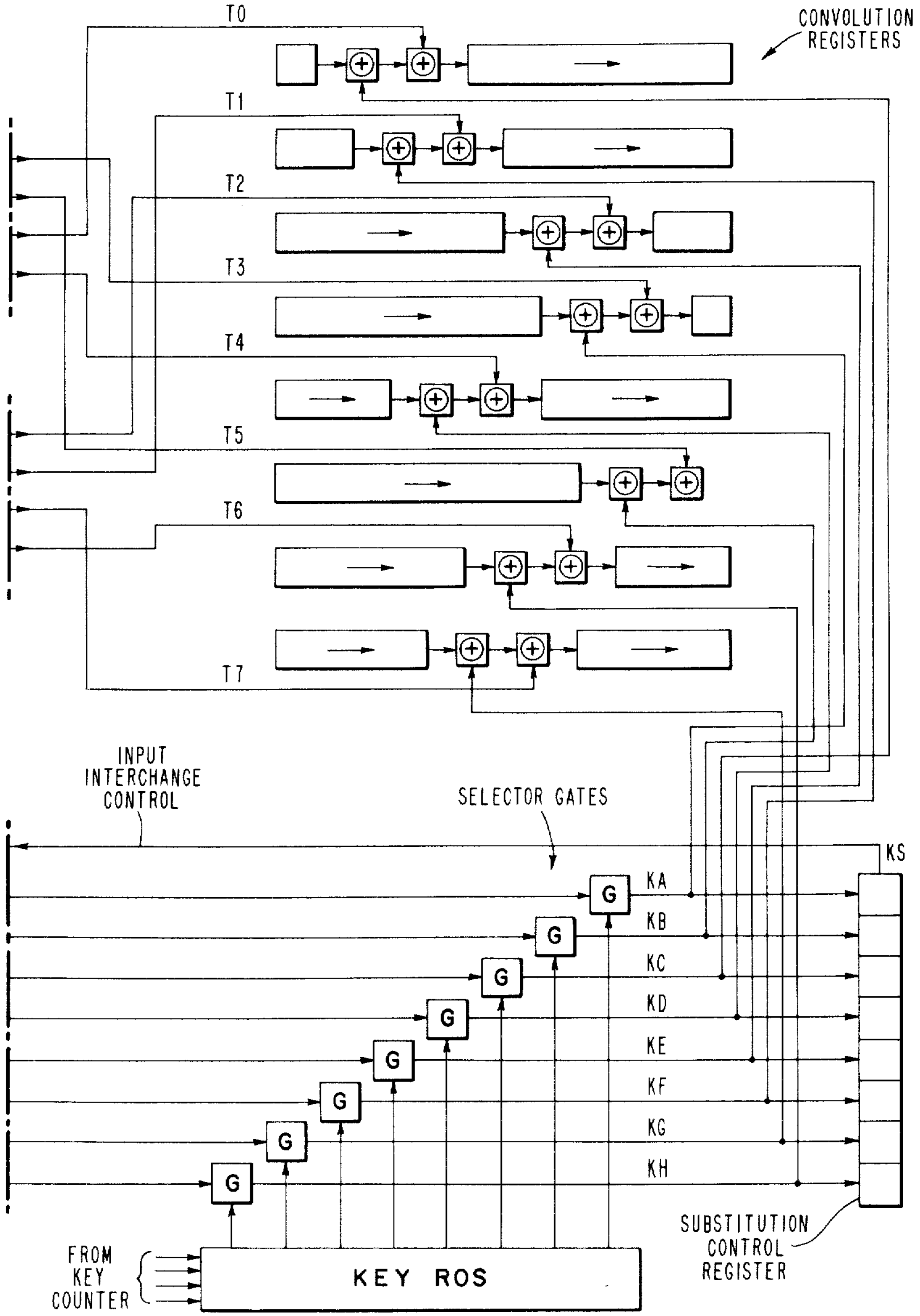

FIG. 8 shows the structure and data flow for the generation of byte transformations from a plurality of source registers and their inputs to a plurality of convolution registers, and the means by which the unique user key that appears in the key register, or alternatively, that is contained in a read-only storage device, is utilized in the encipherment of the clear data. The basic flow of data is to copy information from the source registers and to move it through an input interchange control. Then, through a nonlinear transformation network to convolution registers which build up a ciphered output message. The input interchange control operates under the direction of the substitution control register (output KS) which in turn is derived from the key shift registers.

In order to complete encipherment or decipherment of a complete block, it is necessary to perform byte transformations sequentially. The transformation of bits on lines M0–M7 to the bits on lines T0–T7, is accomplished by means of two different nonlinear 4-bit substitution devices $S_0$ and $S_1$ as shown in FIG. 8. Depending on the value of the input interchange control signal KS which is either a 1 or a 0, source bits M0–M3 are or are not interchanged with source bits M4–M7, as they are applied to substitution devices $S_0$ and $S_1$. Devices $S_0$ and $S_1$ each consist of a 4-bit decoder whose 16 outputs are permutated before being applied to a 4-bit encoder as shown in FIG. 5. The permutations in the two $S_0$ and $S_1$ lines are different, and each is chosen so that a distinct nonlinear transformation results. The 8 outputs from the two $S_0$ and $S_1$ devices are further permuted and the results are identified as T-bits. Thus, the M-bits are transformed according to the value of the key bit that appears as KS.

Again referring to FIG. 8, there is shown the interconnection by which the key bits are brought, a single byte at a time, to the covolution registers in order to cause key interruption. After a subsequent shift of the convolution register, each storage cell to the right of an exclusive-OR adder pair contains the mod-2 sum of 3 bits: the previous bit stored in the cell to the left of the adders, a T-bit, and one of the key bits KA-KH. Note that the placement of the mod-2 adders within the convolution registers is such that no two registers have the adders in the same position. This ensures that all 8 bytes in the convolution registers are capable of being modified after each shift. Assuming that a message has been loaded into the source and convolution registers, and that a particular cipher key has been stored in the key shift registers and further that the cipher key is in the proper position order, the cipher process is begun. The following steps are executed during the confusion-diffusion cycle which produces a modification of data in the convolution registers.

Step 1: If this is a decipher operation, the key registers are shifted one position and the key counter is incremented.

Step 2: The outputs of the key selector gates KA–KH are stored in the 8-bit substitution control shift register whose single output is represented by KS.

Step 3: The output KS is applied as the input interchange control at the input gates to the substitution devices $S_0$ and $S_1$.

Step 4: For each of the outputs of the source registers, M0 to M7, transformed bits T0–T7 are generated subject to the value of KS. The T-bits and the key bits KA–KH are then applied as inputs to the mod-2 adders in the convolution registers.

Step 5: The source registers, the convolution registers, and the substitution control register are all shifted one position. (At this point, the convolution registers contain the outputs of the mod-2 adders.)

Step 6: The key registers are then shifted one position and the key counter is incremented. Note that this step is omitted for an encipher operation if this is the eighth time that the step is being executed for the current confusion-diffusion cycle. Steps 3, 4, 5 and 6 are repeated for a total of eight times each.

Interchange cycle: The contents of the source registers and convolution registers are interchanged by enabling appropriate data-flow lines shown in FIG. 7 and doing eight register shifts.

The confusion-diffusion cycle and the interchange cycle are repeated in alternation for a total of 16 confusion-diffusion cycles and 15 interchange cycles. After the 16th confusion-diffusion cycle, the enciphering or deciphering operation is complete.

Figures 9, 10:
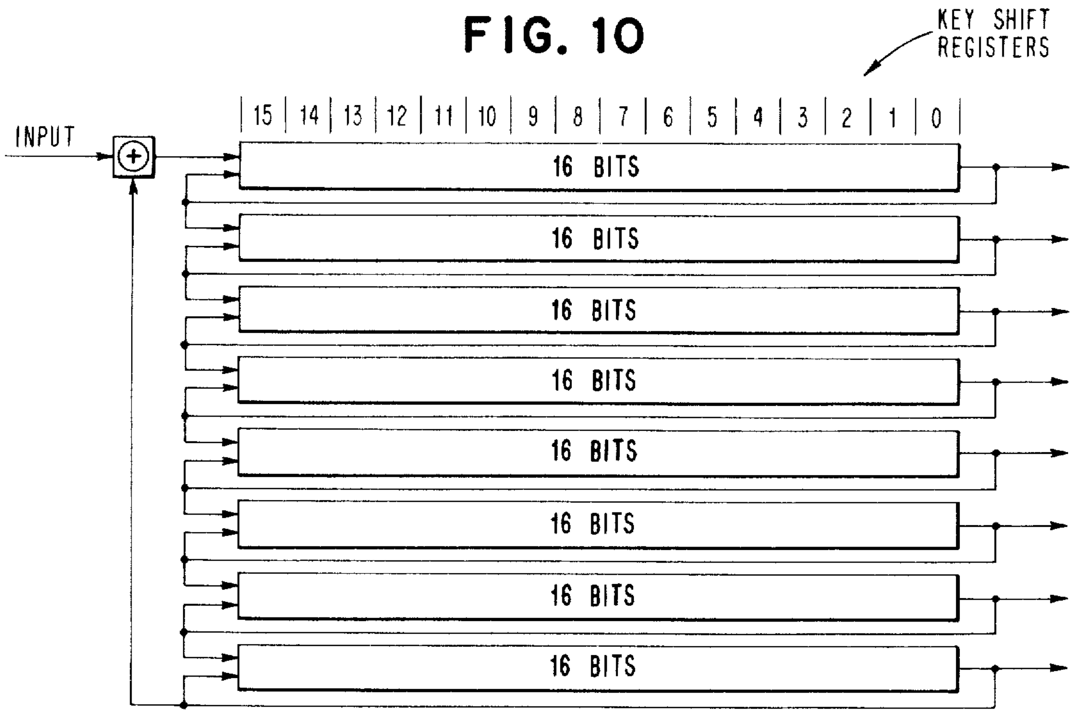
FIG. 9 is a diagramatic representation of the subscriber key-byte accessing order.
FIG. 10 is a diagramatic representation of the key registers which access the subscriber key-byte.

Now referring to FIG. 9, there is shown a diagrammatic representation of the key-byte accessing order. The key is arranged so that key shifting and counting always take place in the forward direction regardless of whether the operation is an encipher or decipher. Furthermore, since the key registers are all 16 bits long and since there are 16 iterations of the confusion-diffusion cycle (with a fixed number of key shifts and counts in each), at the conclusion of any operation on one 16-byte group the key is bound to be in the correct position order for beginning the same operation on the next 16-byte group.

Referring now to FIG. 10, there is shown the key registers with indication as to the procedures for serial loading and the facility for forming the mod-2 sum of two or more keys during loading. After the serial loading through the input, the key is accessed 8 bits at a time. The numbers at the top of FIG. 10 refer not to the bit positions, but to the labels of the key bytes. As the key counter is advanced for each shift, the label of the byte being accessed is indicated by the value of the count.

Again referring to FIG. 9, it is seen that for any particular confusion-diffusion cycle, the corresponding row in the schedule has the following interpretation: the key byte whose label is at the extreme left is the one stored in the substitution control register from which each bit in succession controls the transformation; all 8 bytes in succession, from left to right, are added into the convolution registers during successive 8 executions of Steps 4 and 5 above.

For the encipher operation, the schedule in FIG. 4 is read starting at the top from left to right and down, as in the ordinary reading scan (byte 0 taken first). For the decipher operation, the schedule is read starting at the bottom from left to right and up (byte 9 taken first). Seven key shifts and counts occur in each cycle during an encipher mode operation. This is indicated in the schedule, as each entry there is the mod-16 sum of 7 and the entry above, or the sum of 9 and the 1 below. It should be understood, that according to the schedule the order of performing the confusion-diffusion cycles for decipher is the reverse of the order for encipher. But within each confusion-diffusion cycle, all the steps must be carried out in the same order.

What is claimed is:

1. A cryptographic system for converting a block of data into a block cipher comprising:
- input means for accepting a block of binary data;
- means for presenting key consisting of a plurality of binary representations, said key to be used to control manipulations on said input data;
- non-linear transformation means connected to said input means for carrying out a plurality of substitution transformations on said input data;
- linear transformation means connected to said non-linear transformation means for rearranging the combination of binary representations in said block of data;
- said non-linear transformation means operating under the control of said key;
- whereby the combined transformation executed on said block of data, develops a product block cipher which is a function of said key.

2. The system as defined in claim 1 wherein said non-linear transformation comprises:
- a plurality of substitution devices, each generating a point permutation on a subgroup of data binary representations.

3. The system as defined in claim 2 further comprising:
- a plurality of gate means, each associated with a particular substitution device, said gate means being selectively engaged by a plurality of binary representations derived from said key;
- a plurality of output means each associated with said gate means for presenting said point permutations generated by each substitution device to said linear transformation means.

4. The system as defined in claim 3 wherein said linear transformation means comprises input means for accepting a block of binary representation output signals from said non-linear transformation means;
- a plurality of output means of equal dimension to said plurality of input means;
- a plurality of interconnecting wires for rearranging the location of information signals on said input means to a different combination at said output means.

5. The system as defined in claim 4 further comprising a plurality of storage means each associated with a segment of said subscriber key binary representations;
- said storage means presenting rearrangements of binary representations to said system for controlling the operations of said non-linear transformation means.

6. The system as defined in claim 5 wherein each of said plurality of storage means comprises:
- a cyclic shift register containing a subgroup of the key binary signal representation;
- whereby each shift register is shifted one position for each round of encryption performed by said cryptographic system thereby presenting a different combination of key binary representations for each round.

7. The system as defined in claim 1 further comprising:
- interrupter means connected to said linear transformation means for performing modulo-2 additions of certain binary representations that are outputted from said linear transformation means and certain binary representations from said key;
- feedback means connected to said interrupter means for feeding the results of said modulo-2 additions to said input means.

8. The system as defined in claim 7 further comprising a plurality of bit shift register means for rearranging various combinations of binary signal representation in accordance with the values of certain binary representations in said subscriber key.

9. The system as defined in claim 8 further comprising a plurality of storage means each associated with a segment of said subscriber key binary representations;
- said storage means presenting rearrangements of binary representations to said system for controlling the operations of said non-linear transformation means.

10. The system as defined in claim 9 wherein each of said plurality of storage means comprises:
- a cyclic shift register containing a subgroup of the key binary signal representation;
- whereby each shift register is shifted one position for each round of encryption performed by said cryptographic system thereby presenting a different combination of key binary representations for each round.

11. The system as defined in claim 10 wherein said plurality of bit shift registers are arranged in subgroups, each subgroup being associated with an equal number of information input lines;
- said bit shift registers being a two-bit shift register section having two storage elements and capable of shifting binary data between storage elements;
- whereby said two-bit shift registers are controlled by a plurality of binary representation values derived from various elements within said cycle shift registers.

12. The system as defined in claim 11 further comprising feedback means for introducing the output values of said plurality of modulo-2 additions to said two-bit shift register sections after the completion of each round of encryption.

13. A process for enciphering a message block of binary digits comprising the steps of:
- a. loading said message block of binary digits into a first register means;
- b. loading a key block of binary digits into a second register means;
- c. grouping the message binary digits into a plurality of sets each having n digits;
- substituting for each said set of *n* digits one out of $2^n!$ combinations of *n* binary digits, as determined by the binary condition of selected binary digits in said second register means;
- d. linearly transforming the substituted binary digits, as a group, by rearranging the combination of binary representations;
- e. repeating steps *c* and *d* for a prespecified number of rounds so that upon termination of the prespecified number of rounds the message block is fully enciphered.

* * * * *